United States Patent [19]
Yoshida

[11] Patent Number: 5,943,449
[45] Date of Patent: *Aug. 24, 1999

[54] IMAGE COMMUNICATING METHOD AND APPARATUS EMPLOYING COMMUNICATION OF THE SIZE AND DIRECTION OF THE IMAGE PRIOR TO TRANSMISSION OF THE IMAGE

[75] Inventor: Takehiro Yoshida, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/609,851

[22] Filed: Mar. 1, 1996

[30] Foreign Application Priority Data

Mar. 3, 1995 [JP] Japan ..................................... 7-043994
May 11, 1995 [JP] Japan ..................................... 7-137408

[51] Int. Cl.$^6$ .................................................... H04N 1/00
[52] U.S. Cl. ............................................ 382/296; 358/468
[58] Field of Search ....................................... 358/468, 444, 358/474, 404, 488, 451, 448–449, 434–439; 382/296–299; 355/55–56

[56] References Cited

U.S. PATENT DOCUMENTS

| | | | |
|---|---|---|---|
| 4,575,769 | 3/1986 | Arnoldi | 358/285 |
| 5,521,715 | 5/1996 | Verhaag et al. | 358/401 |
| 5,521,720 | 5/1996 | Yoshida | 358/448 |
| 5,526,137 | 6/1996 | Nameki | 358/406 |
| 5,553,171 | 9/1996 | Lin et al. | 358/445 |
| 5,585,940 | 12/1996 | Seto | 358/434 |

Primary Examiner—Thomas D. Lee
Assistant Examiner—Stephen Brinich
Attorney, Agent, or Firm—Fitzpatrick, Cella, Harper & Scinto

[57] ABSTRACT

An image communicating apparatus which, at the receiving terminal, detects the size and direction of the image to be received, and dependent upon this information both signals the transmitting terminal the resolution of the image data which can be received and later rotates the received image data if appropriate. The transmitting terminal of the image communicating system similarly detects the size and direction of the image inputted to the system and rotates it if appropriate. Further, the transmitting terminal adjusts the scanning resolution of this image based upon the above-described signal transmitted by the receiving terminal.

18 Claims, 18 Drawing Sheets

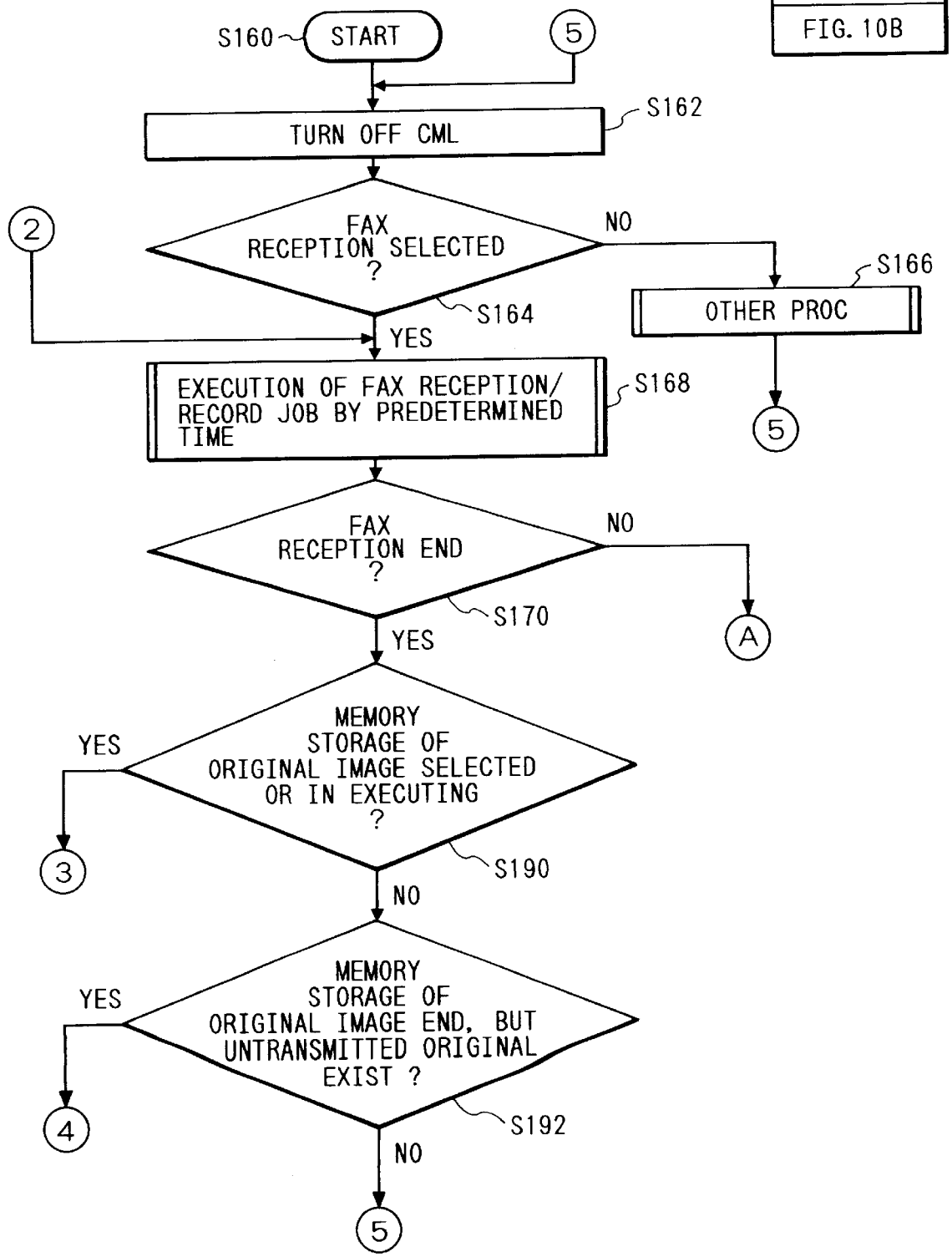

IMAGE COMMUNICATING METHOD AND APPARATUS EMPLOYING COMMUNICATION OF THE SIZE AND DIRECTION OF THE IMAGE PRIOR TO TRANSMISSION OF THE IMAGE

BACKGROUND OF THE INVENTION

1. Field of the Invention

The invention relates to an image communicating apparatus for transmitting and receiving an image and, more particularly, to an image communicating apparatus which can rotate an image.

2. Related Background Art

Hitherto, in such a kind of apparatus, for example, in a facsimile apparatus, there is known an apparatus in which an original image which was read is rotated by 90° and is subsequently transmitted or the received image data is rotated by 90° and is subsequently recorded and outputted to a recording paper.

Such a rotating function operates in a manner such that, for example, in the case where the direction of an original set in a reading unit of a facsimile apparatus doesn't coincide with the direction of an image that can be received on the reception side, the image is rotated by 90° on the transmission side or, in the case where the direction of the received image doesn't coincide with the direction of a recording paper set in a recording unit of the facsimile apparatus, the image is rotated by 90° on the reception side.

As a method for such a rotating process, there is known a method whereby image data is once stored into a memory and the data in the longitudinal direction of the image data and the data in the lateral direction are exchanged by using a memory area for an image processing. According to this method, since the rotating process can be executed at a desired timing, it is efficient.

However, according to the rotating method as mentioned above, in the case where a resolution of image data is high or a size of image data is large, since a large memory capacity of the memory is necessary, the costs increase.

In case of performing both of the rotation of the image data to be transmitted and the rotation of the image data to be printed out as well, it is necessary to provide a memory of a large capacity or to stop either one of the rotating processes and an efficiency deteriorates.

SUMMARY OF THE INVENTION

It is an object of the invention to improve a conventional image communicating apparatus.

Another object of the invention is to provide an image communicating apparatus which can eliminate the conventional problems as mentioned above.

Still another object of the invention is to provide an image communicating apparatus which can save a memory capacity of a memory.

Further another object of the invention is to provide an image communicating apparatus which can effectively use a memory.

Further another object of the invention is to provide an image communicating apparatus which can efficiently perform a rotating process.

Further another object of the invention is to provide an image communicating apparatus which can prevent a remarkable deterioration of a processing efficiency.

The above and other objects and features of the present invention will become apparent from the following detailed description and the appended claims with reference to the accompanying drawings.

DETAILED DESCRIPTION OF THE PREFERRED EMBODIMENTS

Embodiments of the present invention will now be described hereinbelow with reference to the drawings.

[First Embodiment]

Figure 1:
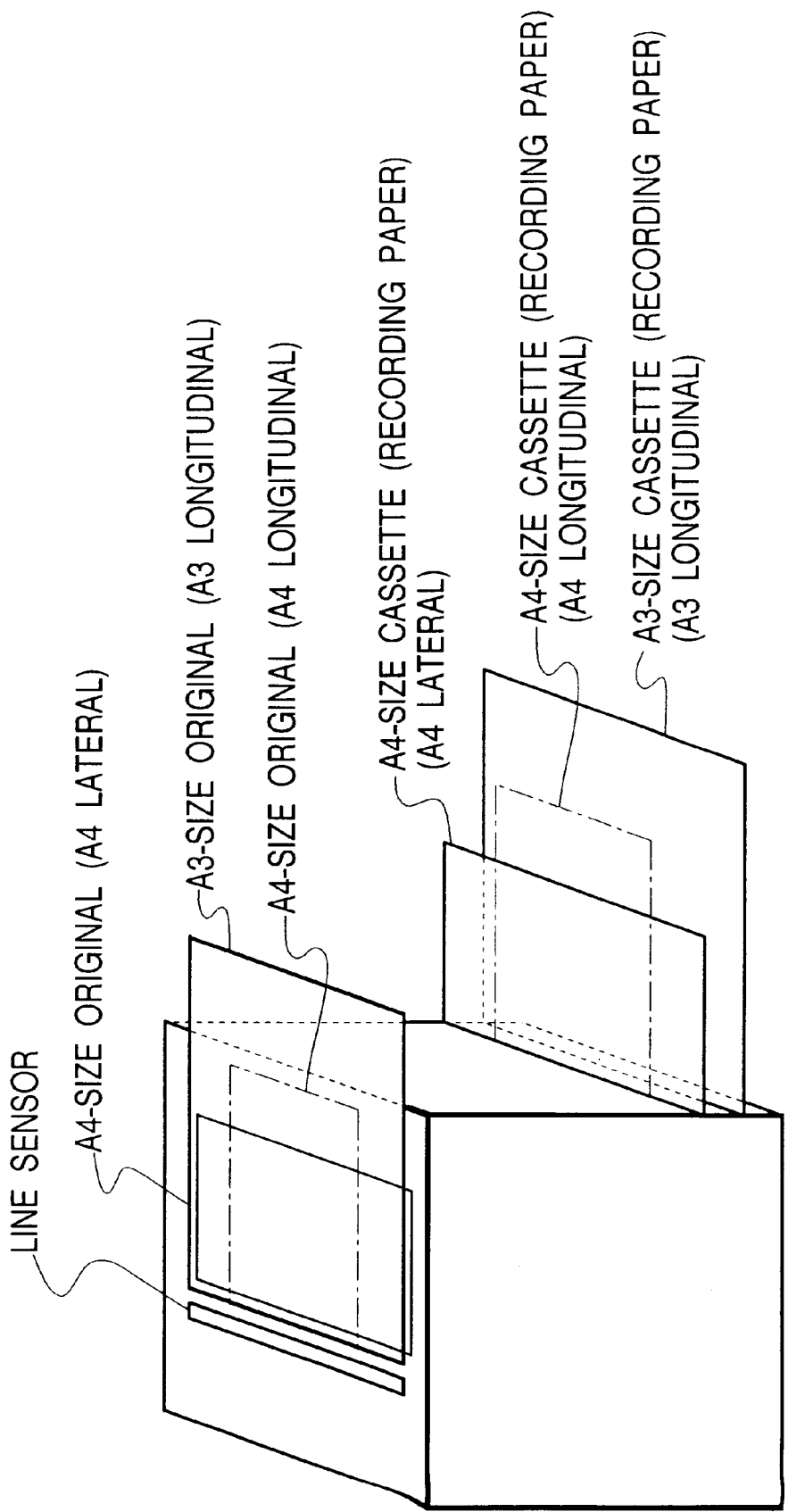
FIG. 1 is a diagram showing a method of setting an original and a recording paper of a facsimile apparatus according to an embodiment of the invention.

FIG. 1 is a perspective view showing a setting method of an original and a recording paper of a facsimile apparatus according to an embodiment of the invention.

As shown in the diagram, in the facsimile apparatus of the embodiment, a maximum reading width in a line sensor of a reading unit and a maximum output width of a recording unit are set to 297 mm as a length in the longitudinal direction of the A4 size. The original and recording paper of the A4 size can be set so as to be conveyed in the lateral and longitudinal directions. The original and recording paper of the A3 size can be set so as to be conveyed in the longitudinal direction. The original and recording paper are conveyed in the direction perpendicular to the line sensor.

Figure 2:
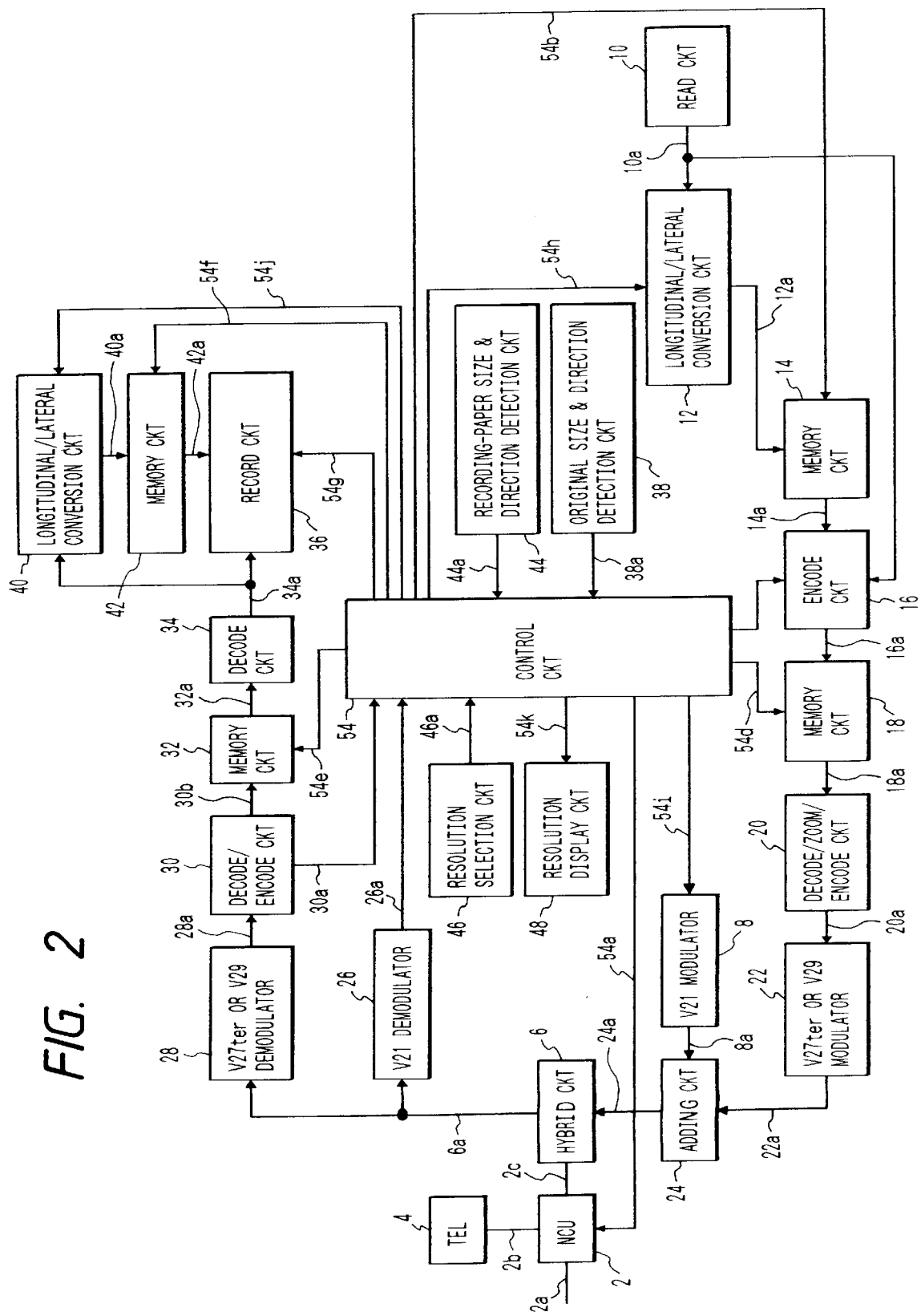
FIG. 2 is a block diagram showing a construction of the facsimile apparatus.

FIG. 2 is a block diagram showing a construction of the facsimile apparatus of the embodiment.

An NCU (network control unit) 2 is connected to a terminal of a telephone line in order to use a telephone network for a data communication or the like and executes a connection control of a telephone exchange network, a switching to a data communication path, and a holding of a loop. When a signal level of a signal line 54a from a control circuit 54 is set to "0", the NCU 2 connects a telephone line 2a to a telephone 4 side (2b). When the signal level is set to "1", the NCU 2 connects the telephone line 2a to a facsimile apparatus side (2c). In the ordinary state, the telephone line 2a is connected to the telephone 4 side.

A hybrid circuit 6 separates a signal of a transmission system and a signal of a reception system and sends a transmission signal from an adding circuit 24 to the telephone line 2*a* via the NCU 2. The hybrid circuit 6 receives a signal from a partner side via the NCU 2 and sends to a V29 demodulator 28 and a V21 demodulator 26 through a signal line 6*a*.

A V21 modulator 8 is a modulator for performing a modulation based on a well-known ITU-T Recommendation V21 and modulates a procedure signal of a signal line 54*i* from the control circuit 54 and sends the modulated signal to the adding circuit 24 through a signal line 8*a*.

A read circuit 10 is constructed by an image pickup device (line sensor) such as a CCD (charge coupled device) or the like and an optical system. The read circuit 10 sequentially reads image signals of one line in the main scanning direction from an original to be transmitted, forms a signal train indicative of a binary value of black and white, and outputs from a signal line 10*a*. The read circuit 10 can read an image of a maximum width of 297 mm.

A longitudinal/lateral conversion circuit 12 recognizes that image data of which size is converted with respect to the longitudinal/lateral directions at which resolution [for example, recognizes that image data of A4 lateral is longitudinal/lateral converted into image data of A4 longitudinal in a fine mode (=8 pel/mm ×7.7 lines/mm)] through a signal line 54*h*. The conversion circuit 12 stores information of, for example, eight lines outputted to the signal line 10*a*, transmits a memory address after it was rotated by 90° from the control circuit 54 by the signal line 54*h*, and stores image data outputted from a signal line 12*a* in accordance with the designated address into a memory circuit 14.

The longitudinal/lateral conversion circuit 12 properly executes a process such as thinning-out, interpolation, or the like of the image data.

In accordance with a control signal which is sent through a signal line 54*b*, the memory circuit 14 stores the image data sent from the signal line 12*a* on the basis of memory address information. After completion of the longitudinal/lateral conversion of the image data of one page, the raw data after the longitudinal/lateral conversion (data which is not compression encoded) is read out and outputted from a signal line 14*a*. The memory circuit 14 is used for the longitudinal/lateral conversion.

When a signal at the signal level "0" has been outputted to a signal line 54*c*, an encode circuit 16 inputs the image data which has been outputted to the signal line 10*a* and is not longitudinal/lateral converted. When a signal at the signal level "1" has been outputted to the signal line 54*c*, the encode circuit 16 inputs the image data which has been outputted to the signal line 14*a* and has been longitudinal/lateral converted and executes a compression encoding (MR encoding of K=8). After that, the encoded data is outputted to a signal line 16*a*.

In accordance with a control signal which is sent through a signal line 54*d*, a memory circuit 18 stores the encoded data outputted from the signal line 16*a*. The stored encoded data is outputted from a signal line 18*a*.

A decode/zoom/encode circuit 20 is a circuit for inputting the signal outputted from the signal line 18*a*, once decoding and zooming the signal as necessary, and again encoding. The encoded data is outputted from a signal line 20*a*.

A modulator 22 performs a modulation based on a well-known ITU-T Recommendation V27ter (differential phase modulation) or V29 (orthogonal modulation). The modulator 22 inputs the image signal from the signal line 20*a* and modulates and outputs the modulated data from a signal line 22*a*.

The adding circuit 24 inputs the signals from the signal lines 8*a* and 22*a* and outputs an addition result from a signal line 24*a*.

The demodulator 26 performs a demodulation based on the well-known ITU-T Recommendation V21. The demodulator 26 inputs the signal from the signal line 6*a* and executes the V21 demodulation and outputs the demodulated data from a signal line 26*a*.

A demodulator 28 performs a demodulation based on the well-known ITU-T Recommendation V27ter (differential phase modulation) or V29 (orthogonal modulation). The demodulator 28 inputs the signal from the signal line 6*a* and performs the demodulation and outputs the demodulated data from a signal line 28*a*.

A decode/encode circuit 30 inputs the demodulated data from the signal line 28*a* and decodes this data and outputs the decoded data from a signal line 30*a*. Further, the data which was again subjected to the MR encoding of (K=8) is outputted from a signal line 30*b*.

In accordance with a control signal which is sent through a signal line 54*e*, the memory circuit 32 stores the encoded data outputted to the signal line 30*b* into a memory circuit 32. In accordance with a control signal which is sent through the signal line 54*e*, the data stored in the memory circuit 32 is outputted from a signal line 32*a*.

A decode circuit 34 inputs the signal outputted from the signal line 32*a* and decodes (MR decoding of K=8) and, after that, outputs the decoded data from a signal line 34*a*.

A longitudinal/lateral conversion circuit 40 recognizes that the image data of which size is longitudinal/lateral converted at which resolution through a signal line 54*j* (for example, recognizes that an original of A4 lateral is longitudinal/lateral converted into an original of A4 longitudinal in a fine mode), stores information outputted from the signal line 34*a* by an amount of, for example, eight lines, sends a memory address after completion of the rotation of 90° from the control circuit 54 by the signal line 54*j*, and stores the image data outputted from the signal line 40*a* into a memory circuit 42 in accordance with the transmitted address.

The longitudinal/lateral conversion circuit 40 properly executes a process such as thinning-out, interpolation, or the like of the image data.

In accordance with a control signal sent through a signal line 54*f*, the memory circuit 42 designates a column memory address and stores the data which was outputted from the signal line 40*a* and was longitudinal/lateral converted. After completion of the longitudinal/lateral conversion of the image data of one page, the memory circuit 42 reads out the raw data after the longitudinal/lateral conversion (data which is not compression encoded) and outputs from a signal line 42*a*. The memory circuit 42 is used for the longitudinal/lateral conversion.

When a signal at the signal level "0" has been outputted to a signal line 54*g*, a record circuit 36 inputs the image data which has been outputted to the signal line 34*a* and is not longitudinal/lateral converted. When a signal at the signal level "1" has been outputted to the signal line 54*g*, the record circuit 36 inputs the image data which has been outputted to the signal line 42*a* and was longitudinal/lateral converted and sequentially records one line by one.

A detection circuit 38 is a circuit for detecting a size and a direction of an original set on an original supporting glass plate. When the original of the A4 size is set longitudinally (short side is parallel with the line sensor), the detection circuit 38 generates a signal of "0" to a signal line 38*a*. When the original of the A4 size is set laterally (long side is in parallel with the line sensor), the detection circuit 38 generates a signal of "1" to the signal line 38*a*. When an original of the A3 size is set longitudinally, the detection circuit 38 generates a signal of "2" to the signal line 38*a*.

A detection circuit 44 is a circuit for detecting a size and a direction of a recording paper set in a recording paper cassette. The detection circuit 44 sequentially generates information in accordance with the order of information about the presence or absence of the recording paper of A4 size longitudinal, information about the presence or absence of the recording paper of A4 size lateral, and information about the presence or absence of the recording paper of A3 size longitudinal. When there is a recording paper, a signal of "1" is generated. When there is no recording paper, a signal of "0" is outputted. For example, when there is no recording paper of A4 size longitudinal and no recording paper of A3 size longitudinal but there is a recording paper of A4 size lateral, a signal of "0, 1, 0" is outputted to a signal line 44a.

A resolution selection circuit 46 is a circuit for selecting a resolution when the read circuit 10 reads the original. As a resolution, there are various resolutions such as standard mode (8 pel/mm in the main scanning direction, 3.85 lines/mm in the sub-scanning direction), fine mode (8 pel/mm in the main scanning direction, 7.7 lines/mm in the sub-scanning direction), and super fine mode (8 pel/mm in the main scanning direction, 15.4 lines/mm in the sub-scanning direction). When those modes are selected, signals of "0", "1", and "2" are outputted from a signal line 46a, respectively.

A resolution display circuit 48 is a circuit to display the resolution selected by the resolution selection circuit 46. When the signal "0" is outputted from a signal line 54k, the standard mode is displayed. When the signal "1" is outputted from the signal line 54k, the fine mode is displayed. When the signal "2" is outputted from the signal line 54k, the super fine mode is displayed.

The control circuit 54 controls each unit of the apparatus.

In the embodiment, when the image data of A4 size longitudinal is received, if the recording paper of the A4 size is laterally set and the recording paper of the A4 size is not vertically set, the longitudinal/lateral conversion is needed. Therefore, the control circuit 54 declares the fine mode as a resolution which can be received to the partner side. When the recording paper of the A4 size is vertically set, since the longitudinal/lateral conversion is unnecessary, the control circuit 54 declares the super fine mode as a resolution that can be received to the partner side. When both of the recording papers of A4 lateral and A4 longitudinal are not set, the control circuit 54 declares that the image can be received in the super fine mode to the partner side and a substituting reception (interception) is performed as an image of the A4 size by the memory circuit 32. In the case where the image is transmitted as an image of A4 size longitudinal and when the original of the A4 size is laterally set, since the longitudinal/lateral conversion is necessary, the resolution of the image to be transmitted is set to up to the maximum fine mode. When the image of the A4 size is longitudinally set and when the original of the A3 size is longitudinally set, since the longitudinal/lateral conversion is unnecessary, the resolution is set to up to the maximum super fine mode. Thus, the memory can be effectively used and the memory capacity can be saved.

FIGS. 3 to 6 show a flow of a control by the control circuit 54.

Figure 3:
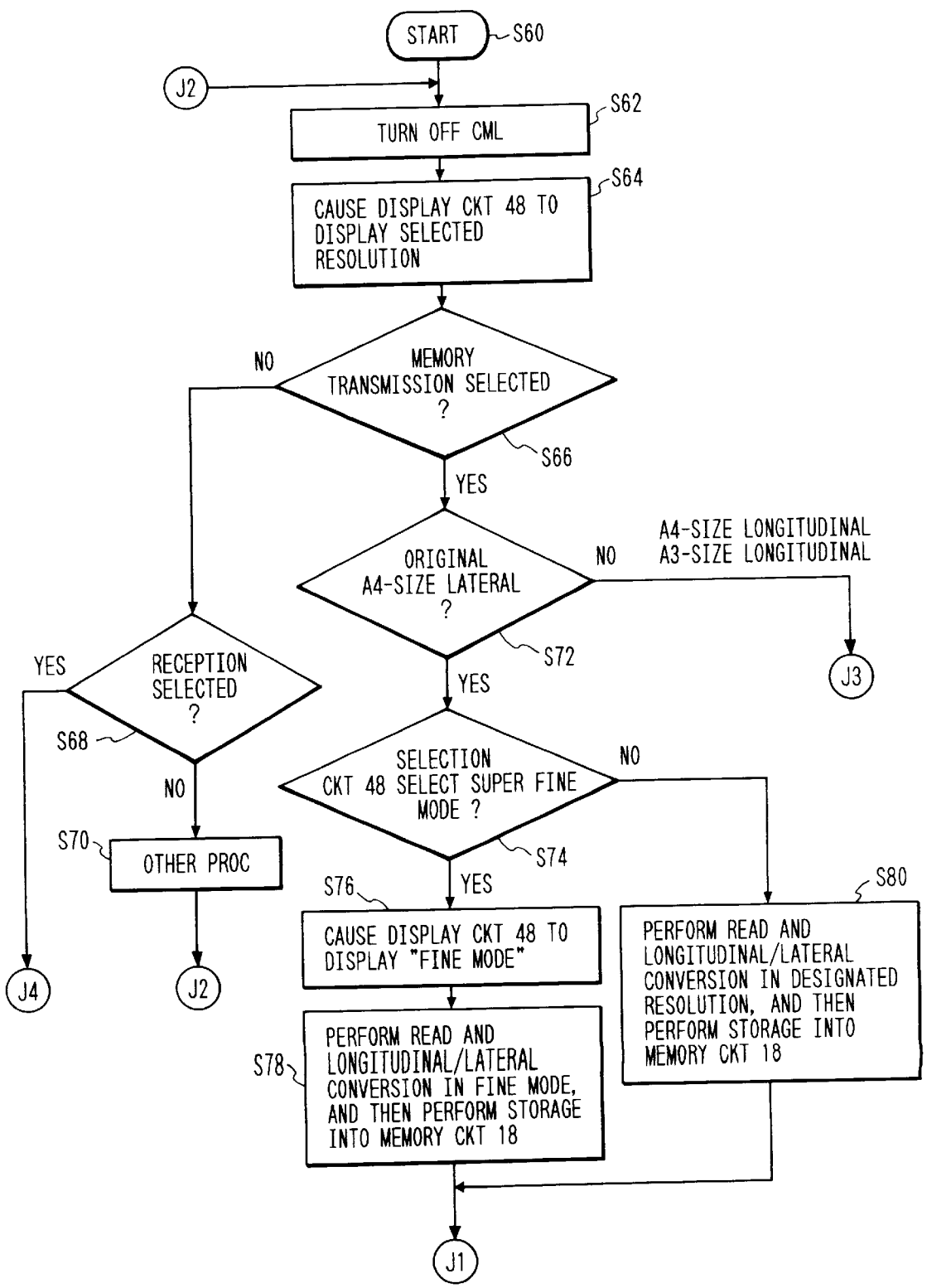
FIGS. 3 to 6 are flowcharts showing a flow of processes according to the first embodiment.

In FIG. 3, step S60 denotes the start of the control. First in step S62, the signal of the signal level "0" is outputted from the signal line 54a and a CML is turned off. In step S64, selection information of the resolution outputted from the signal line 46a is inputted and outputted from the signal line 54k and the resolution display circuit 48 is allowed to display a signal based on the selection information as a resolution selected at present.

In steps S66 and S68, checks are made to see if a memory transmission (after the image data read by the read circuit 10 was once stored in the memory circuit 18, it is transmitted) and a reception have been selected. When the memory transmission is selected, step S72 follows. When the reception is selected, step S94 follows. When both of the memory transmission and the reception are not selected yet, step S70 follows and other processes are executed.

In step S72, the information is inputted from the signal line 38a and a check is made to see if the original set on the original supporting glass plate is A4 size lateral. If YES, step S74 follows. When the original is A4 size longitudinal or A3 size longitudinal, the processing routine advances to step S92.

In step S74, the information is inputted from the signal line 46a and a check is made to see if the transmission in the super fine mode has been selected. If YES, step S76 follows. When the transmission in the super fine mode is not selected, step S80 follows.

In step S76, the signal "1" is outputted from the signal line 54k, thereby allowing the display circuit 48 to display the fine mode as a resolution. In step S78, the read circuit 10 is allowed to read the original in the fine mode. After completion of the longitudinal/lateral conversion, the image data is encoded and stored into the memory circuit 18. In step S80, the read circuit 10 is allowed to read the original at the resolution designated through the signal line 46a. After completion of the longitudinal/lateral conversion, the image data is encoded and stored into the memory circuit 18. Namely, since the longitudinal/lateral conversion is needed here, even if the super fine mode is selected, the processes are executed in the fine mode in order to save the memory capacity of the memory circuit 18.

Figure 4:
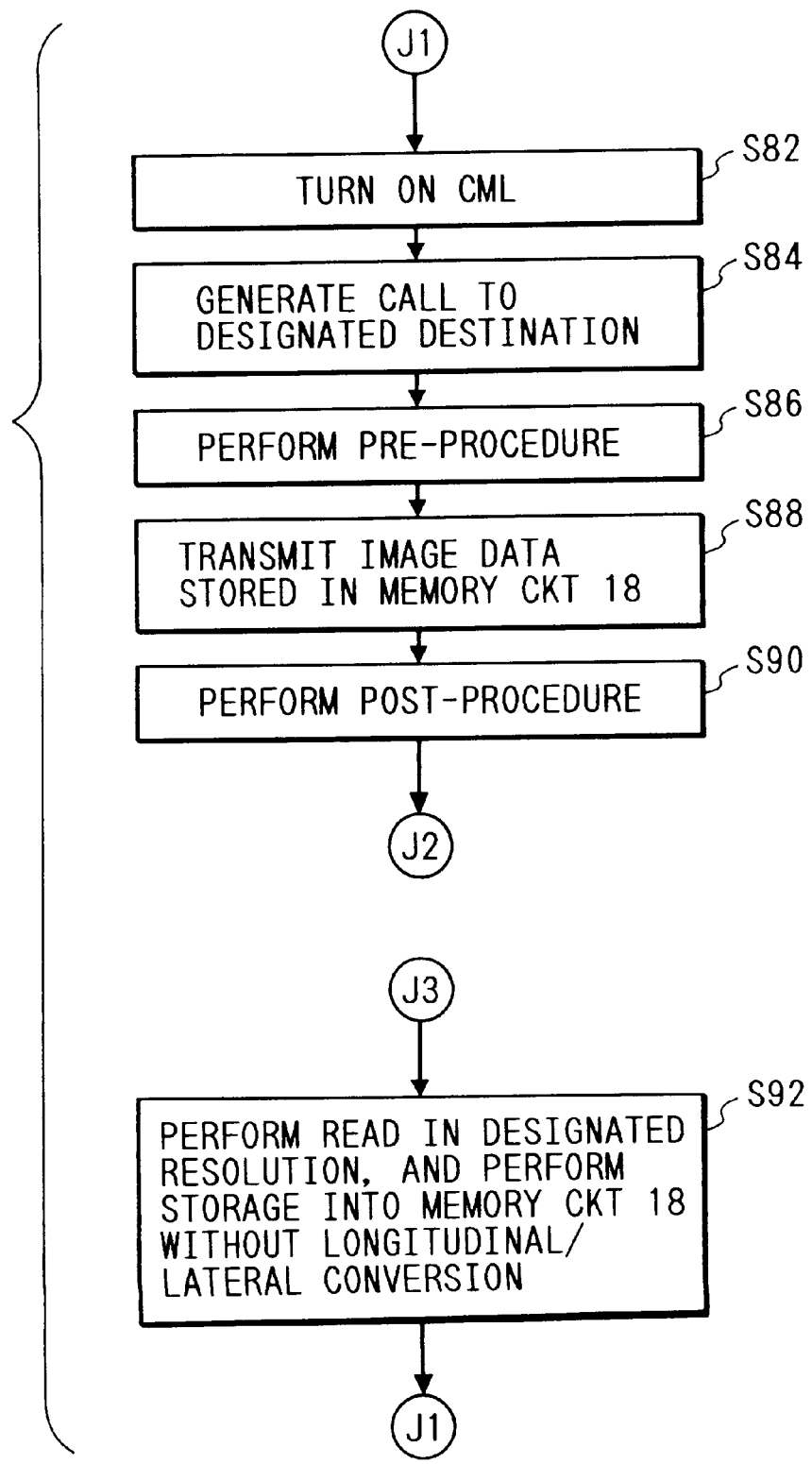

In step S82 in FIG. 4, the signal at the signal level "1" is outputted from the signal line 54a and the CML is turned on. In step S84, a call is generated to the designated destination [on the basis of a dial input from a console unit (not shown)]. In step S86, a pre-procedure (transmission and reception of a procedure signal to/from the partner side) is executed. In step S88, the image data stored in the memory circuit 18 is transmitted. In step S90, a post-procedure is executed. In step S92, the read circuit is allowed to read the original at the resolution designated through the signal line 46a. The image data is encoded without performing the longitudinal/lateral conversion and the encoded data is stored into the memory circuit 18.

Figure 5:
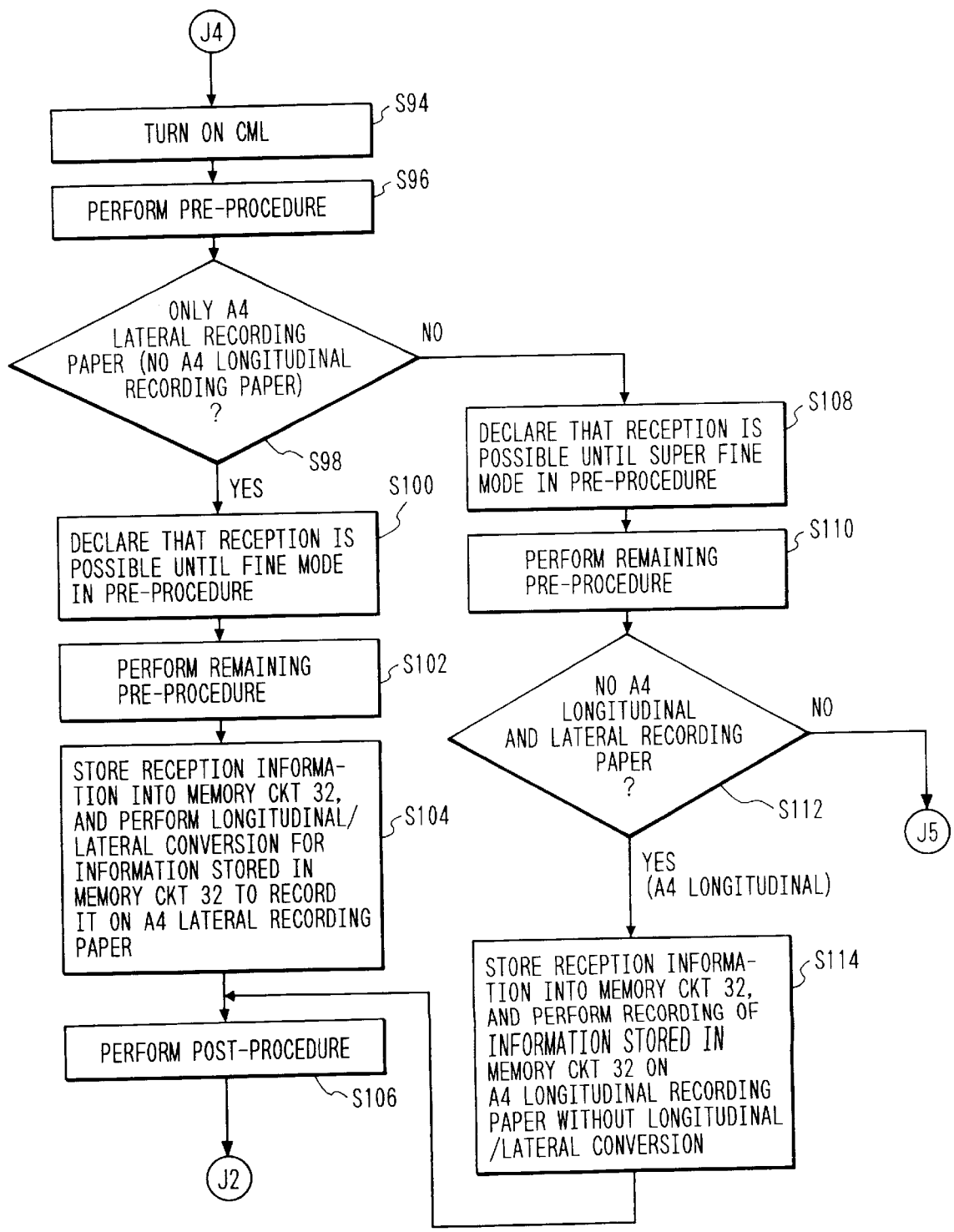

In step S94 in FIG. 5, the signal at the signal level "1" is outputted from the signal line 54a and the CML is turned on. In step S96, the pre-procedure is executed. The case where the recording paper of the A3 size is not set but only the recording paper of the A4 size is set will now be described hereinbelow.

In step S98, a check is made to see if there is only the recording paper of A4 lateral at present and there is no recording paper of A4 longitudinal or not. If YES, step S100 follows. If NO (when there is the recording paper of A4 longitudinal or when there is no recording paper of A4 lateral and no recording paper of A4 longitudinal), the processing routine advances to step S108.

In step S100, a fact that the original image can be received up to the fine mode is declared to the partner side by the pre-procedure. In step S102, the remaining pre-procedure is executed. In step S104, the image data received from the reception side is decoded and is again subjected to the MR encoding of (K=8) and the encoded data is stored into the memory circuit 32. The image data stored in the memory circuit 32 is longitudinal/lateral converted and is recorded onto the recording paper of A4 lateral. A post-procedure is executed in step S106.

In step S108, a fact that the image data can be received up to the super fine mode is declared to the partner side by the pre-procedure. In step S110, the remaining pre-procedure is executed. In step S112, a check is made to see if both of the recording paper of A4 longitudinal and the recording paper of A4 lateral don't exist or not. When they don't exist, step S116 follows. When there is the recording paper of A4 longitudinal, step S114 follows.

In step S114, the image data received from the reception side is decoded and is again subjected to the MR encoding of (K=8) and the encoded data is stored into the memory circuit 32. Further, the information stored in the memory circuit 32 is not longitudinal/lateral converted but is recorded to the recording paper of A4 longitudinal.

Figure 6:
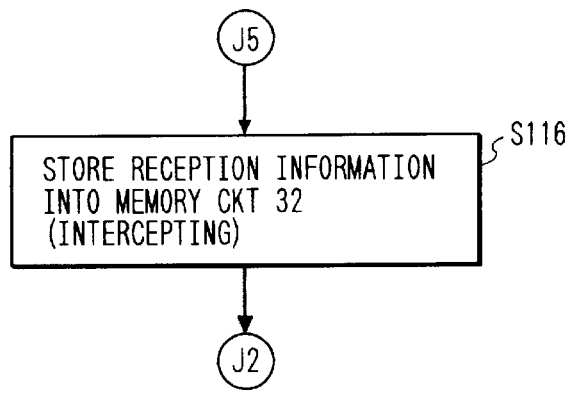

In step S116 in FIG. 6, the image data received from the reception side is stored into the memory circuit 32 (substituting reception or interception). The information which was substitution received is read out and recorded when there is an output instruction by the operator after the recording paper was set.

[Second Embodiment]

According to the second embodiment, means for longitudinal/lateral converting the received information is provided, a memory to store the received information is commonly used as a memory for longitudinal/lateral converting the received information, and when the recording paper of a predetermined size is laterally set, the declaration of a line density which can be received is changed in accordance with the memory capacity which can be used to longitudinal/lateral convert the received information.

As for a memory capacity which can be used to longitudinal/lateral convert the received information, the image data can be received up to the standard mode so long as (2 Mbits≦the memory capacity<4 Mbits). The image data can be received up to the fine mode so long as (4 Mbits≦the memory capacity<8 Mbits). The image data can be received up to the super fine mode so long as (8 Mbits≦the memory capacity).

Figure 7:
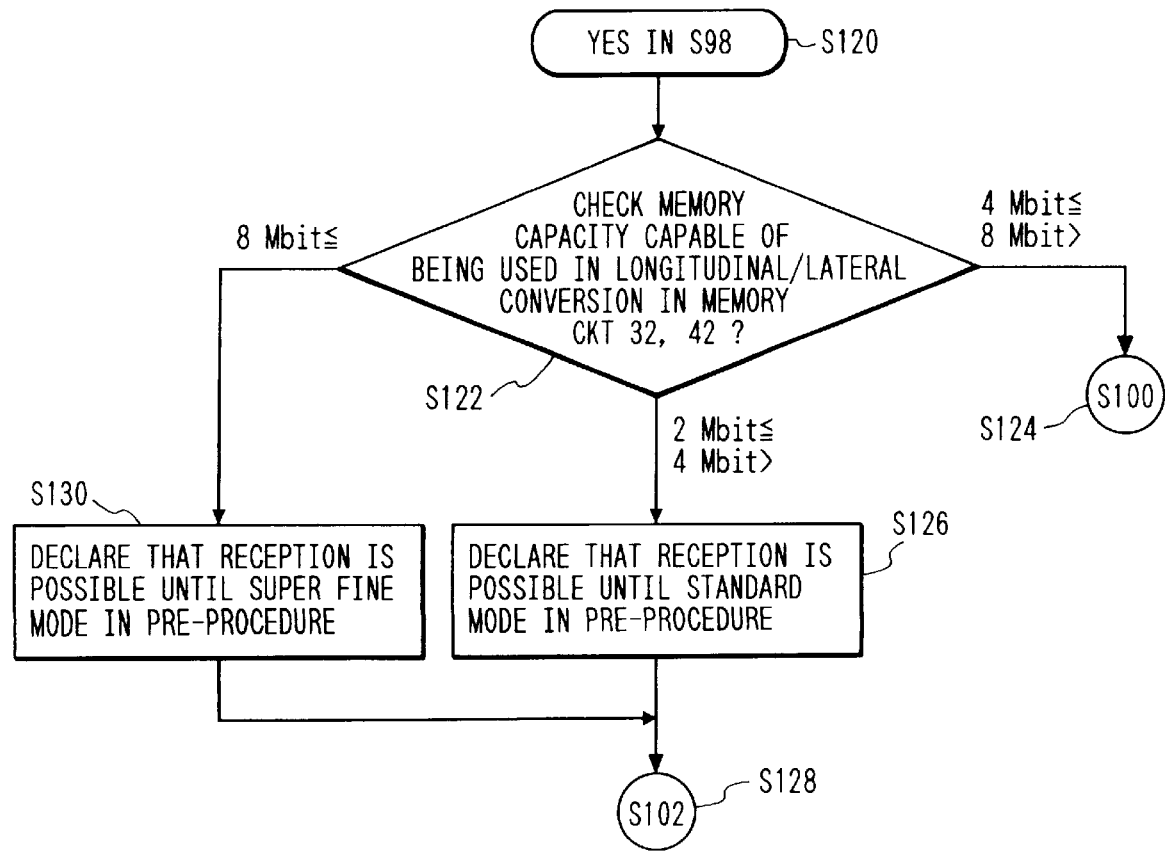
FIG. 7 is a flowchart showing a flow of processes according to the second embodiment.

FIG. 7 shows a specific example of the above control and shows a flow for a control regarding portions different from those in the control flow shown in FIGS. 3 to 6.

The memory circuits 32 and 42 are the same memory circuit. Namely, those two memory circuits can be used in both of the applications.

A processing step S120 in FIG. 7 corresponds to the case of "YES" in step S98 in FIG. 5. In step S122, the memory capacity which can be used for the longitudinal/lateral conversion of the image data received from the reception side in a vacant area in the memory circuits 32 and 42 is checked. When (2 Mbits≦the memory capacity<4 Mbits), a fact that the image data can be received up to the standard mode is declared to the partner side by the pre-procedure in step S126. The processing routine advances to step S128 (step S102 in FIG. 5).

In step S122, when (4 Mbits≦the memory capacity<8 Mbits), step S124 (step S100 in FIG. 5) follows. When (8 Mbits≦the memory capacity), a fact that the image data can be received up to the super fine mode is declared to the partner side by the pre-procedure in step S126. It is assumed that at least 2 Mbits are assured in order to longitudinal/lateral convert the image data received from the reception side.

[Third Embodiment]

In the third embodiment, means for longitudinal/lateral converting read information is provided and the memory for storing the information obtained by encoding the read information for the purpose of the memory transmission is commonly used as a memory for longitudinal/lateral converting the read information. When the original of a predetermined size is laterally set, the resolution of the image data which can be transmitted is changed in accordance with the memory capacity which can be used for longitudinal/lateral converting the read information.

As for the memory capacity which can be used to longitudinal/lateral convert the read information, the longitudinal/lateral conversion after the reading can be performed up to the standard mode when (2 Mbits≦the memory capacity<4 Mbits). The longitudinal/lateral conversion after the reading can be performed up to the fine mode when (4 Mbits≦the memory capacity<8 Mbits). The longitudinal/lateral conversion after the reading can be performed up to the super fine mode when (8 Mbits≦the memory capacity).

Figure 8:
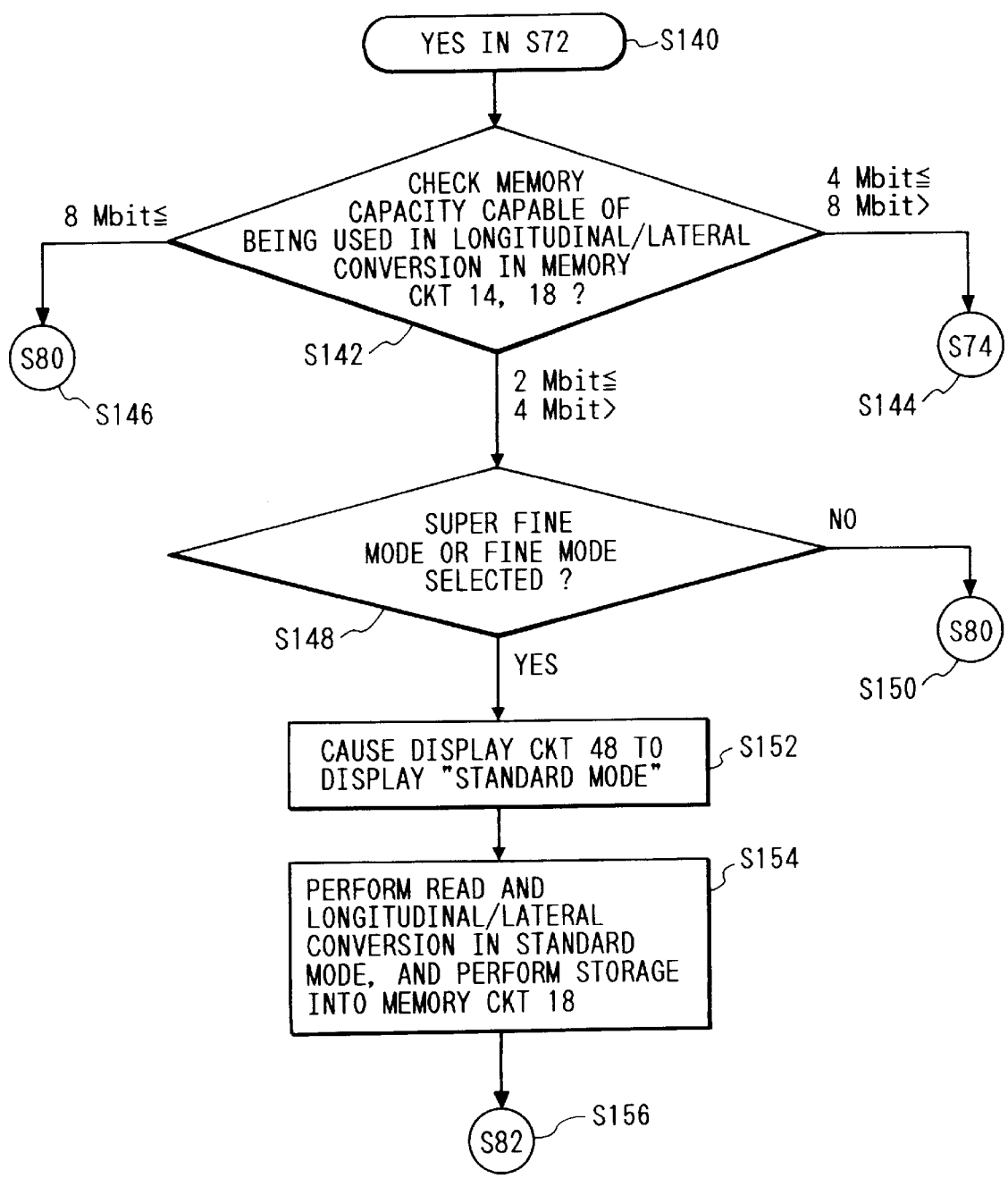
FIG. 8 is a flowchart showing a flow of processes according to the third embodiment.

FIG. 8 shows a specific example of the above control and shows a flow for control of portions different from those in the control flow of FIGS. 3 to 6.

The memory circuits 14 and 18 are the same memory circuit. Namely, those two memory circuits can be used in both of the applications.

Processing step S140 in FIG. 8 corresponds to "YES" in step S72 in FIG. 3. In next step S142, the memory capacity which can be used for longitudinal/lateral converting the read information in the memory circuits 14 and 18 is discriminated. When (2 Mbits≦the memory capacity<4 Mbits), step S148 follows. When (4 Mbits≦the memory capacity<8 Mbits), step S144 (step S74 in FIG. 3) follows. When (8 Mbits≦the memory capacity), step S146 (step S80 in FIG. 3) follows.

In step S148, information is inputted from the signal line 46a and a check is made to see if the transmission in the super fine mode or fine mode has been selected. If YES, step S152 follows. If NO, step S150 (step S80 in FIG. 3) follows.

In step S152, the signal "0" is outputted to the signal line 54k and the display circuit 48 is allowed to display "standard mode". In step S154, the read circuit 10 is allowed to read the original in the standard mode. After completion of the longitudinal/lateral conversion, the converted image data is encoded and stored into the memory circuit 18. Next step S156 shows step S82 in FIG. 4.

Namely, since the remaining memory capacity is small, the process is executed in the standard mode here.

[Fourth Embodiment]

In the above second and third embodiments, the memory to store the received information and the memory to store the information to be subjected to the memory transmission can be also commonly used. A control flow in this case, the processes in FIGS. 7 and 8 are applied to the processes in FIGS. 3, 4, 5, and 6. Further, it is sufficient that the memory capacities which can be used for the longitudinal/lateral conversion in the memory circuits 14, 18, 32, and 42 are discriminated in steps S122 and S142, respectively.

According to the invention as described above, the memory for longitudinal/lateral converting the received information can be saved. Further, by setting the recording paper in the longitudinal direction, a fact that the imaged data can be received at the maximum resolution which the apparatus has can be declared.

According to the invention, the memory to store the received information and the memory for longitudinal/ lateral converting the received information can be commonly used. By changing the declaration of the resolution which can be received in accordance with the memory capacity which can be used for the longitudinal/lateral conversion, the memory can be effectively used.

According to the invention, the memory for longitudinal/lateral converting the read information can be saved. Further, by setting the original in the longitudinal direction, the image data can be transmitted at the highest resolution which the apparatus has.

According to the invention, the memory to store the read information upon transmission and the memory for longitudinal/lateral converting the read information can be commonly used. By changing the resolution of the image data to be transmitted in accordance with the memory capacity which can be used for the longitudinal/lateral conversion, the memory can be effectively used.

According to the invention, the memory to store the image data to be transmitted, the memory to store the received image data, the memory which is used when the read image data is longitudinal/lateral converted, and the memory which is used when the received image data is longitudinal/lateral converted can be commonly used, so that the memory can be similarly effectively used.

According to the invention, therefore, since it is sufficient to use the small memory capacity, a facsimile apparatus which can reduce the costs of the apparatus and can raise the resolution of the image to the highest limit value can be realized.

[Fifth Embodiment]

Figure 9:
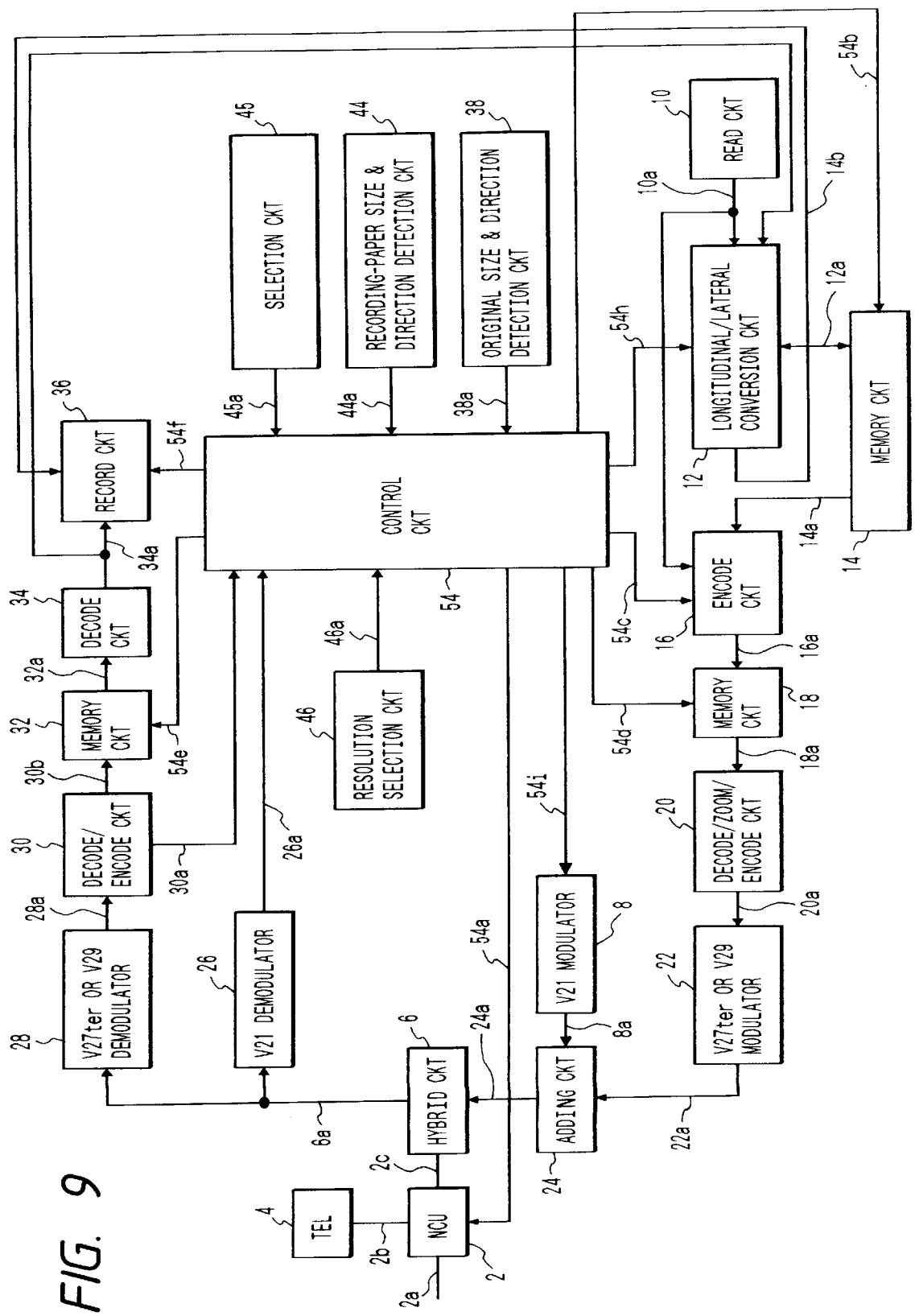
FIG. 9 is a block diagram showing a construction of a facsimile apparatus according to another example.

FIG. 9 is a block diagram showing a circuit construction of a facsimile apparatus according to the fifth embodiment.

Since the portions which execute operations similar to those in FIG. 2 are designated by the same reference numerals, their descriptions are omitted here.

In FIG. 9, the longitudinal/lateral conversion circuit 12 executes both of the process for rotating the original image which was read by the read circuit 10 and the process for rotating the image data to be recorded by the record circuit 36. The memory circuit 14 is commonly used for those two processes.

The operation for simultaneously executing the rotation of the original image read by the read circuit 10 and the rotation of the image data to be recorded by the record circuit 36 is called a "dual operation" hereinafter.

A selection circuit 45 is a circuit for selecting the operation in the case where the dual operation is selected and the dual operation is impossible due to the resolutions (for example, when both of the resolutions are set to the super fine mode). After completion of the operation in operating, when it is selected that the next operation is executed, the selection circuit 45 generates a signal at the signal level "0" from a signal line 45a. When it is selected that the process is alternately executed every page, the selection circuit 45 generates a signal at the signal level "1" from the signal line 42a.

The control circuit 54 controls the entire facsimile apparatus in the embodiment. Particularly, in the fifth embodiment, the following control is executed.

It is now assumed that the memory circuit 14 has a memory capacity enough to perform the longitudinal/lateral conversion (90° rotation) by the dual operation so long as the resolution is equal to a resolution up to the fine mode (8 pel/mm ×7.7 lines/mm) and the image data relates to an original of up to the A4 size.

In the case where it is necessary to simultaneously execute the longitudinal/lateral conversion of the image data read by the read circuit 10 and the longitudinal/lateral conversion of the image data to be recorded by the record circuit 36 (to execute the dual operation), the control circuit 54 permits the execution so long as both of the resolutions of the image data are equal to or less than that in the fine mode and the sizes are equal to or less than A4. The control circuit 54 allows either one of the longitudinal/lateral conversions to be executed when the resolution of either one of the image data is set to the super fine mode (8 pel/mm ×15.4 lines/mm).

FIGS. 10A to 13 are flowcharts showing the control operation of the control circuit 54 according to the fifth embodiment.

In step S162, a signal at the signal level "0" is outputted to the signal line 54a and the CML is turned off. In step S164, a check is made to see if the facsimile reception has been selected. When it is selected, step S168 follows. If NO, step S166 follows and other processes are executed.

Figure 12:
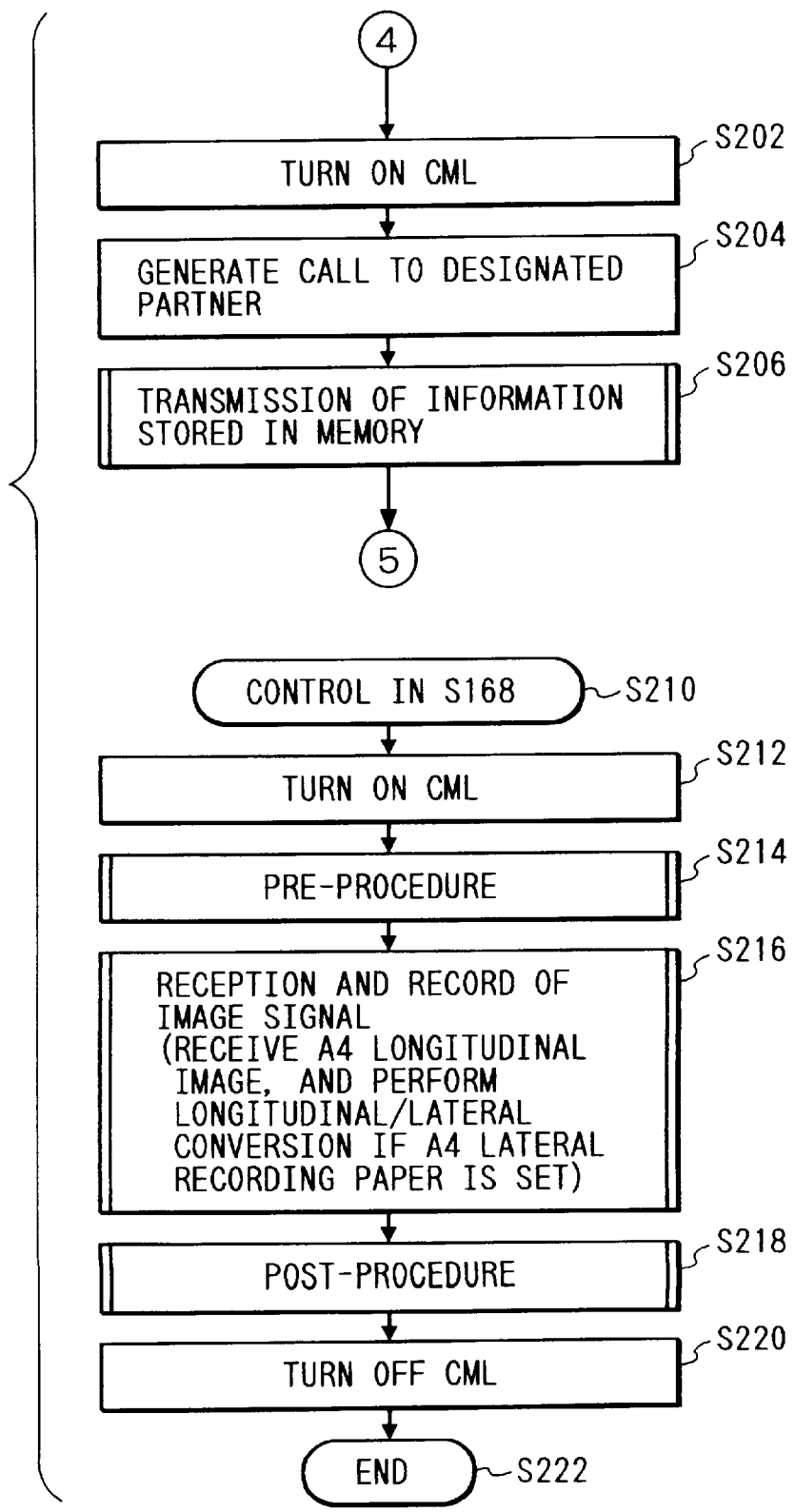

In step S168, the facsimile reception and the recording by the record circuit 36 of the received image data are executed. Specifically speaking, processes in steps S212 to S222 shown in FIG. 12 are sequentially executed for a predetermined time (about 500 μsec).

In step S170, a check is made to see if the facsimile reception has been finished. When it is finished, step S190 follows. If NO, step S172 follows.

In step S172, a check is made to see if the longitudinal/lateral conversion of the received image data (specifically speaking, in the case where the image of the original of A4 longitudinal has been received and the recording paper of A4 lateral is set) is being executed. When it is being executed, step S174 follows. If NO, step S186 follows.

In step S174, a check is made to see if the reception mode (resolution of the received image data) is the super fine mode. When it is the super fine mode, step S175 (FIG. 13) follows. If NO, step S177 follows.

Figure 13:
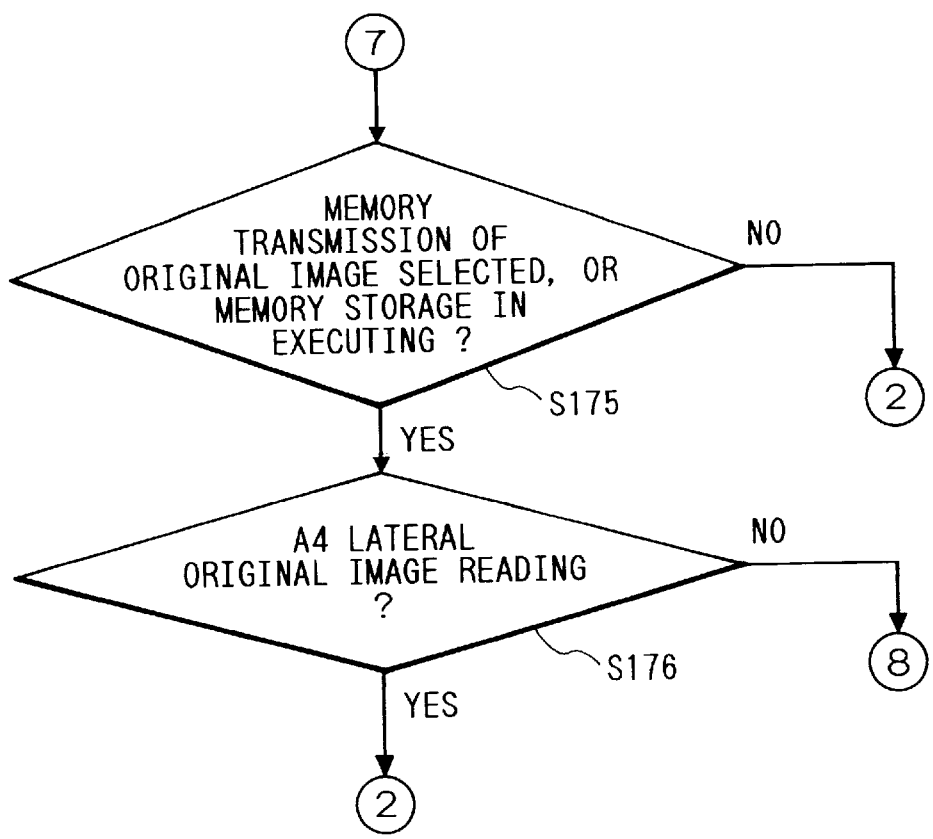

In FIG. 13, in step S175, a check is made to see if the memory transmission of the original image (after the whole original image was stored into the memory circuit 18, it is transmitted) has been selected or the storage into the memory circuit 18 is being executed or not. If YES, step S176 follows. If NO, step S168 follows.

In step S176, a check is made to see if the image of the original of A4 lateral which was set is read. When the original of A4 lateral is read, although the longitudinal/lateral conversion is needed, since the received image is based on the super fine mode, it is judged that the longitudinal/lateral conversion cannot be simultaneously executed because of a lack of memory capacity of the memory circuit 14, so that the processing routine advances to step S168. When an original other than the original of A4 lateral is read, since the longitudinal/lateral conversion is unnecessary, step S180 follows and the image data is stored into the memory circuit 18.

Figure 10B:
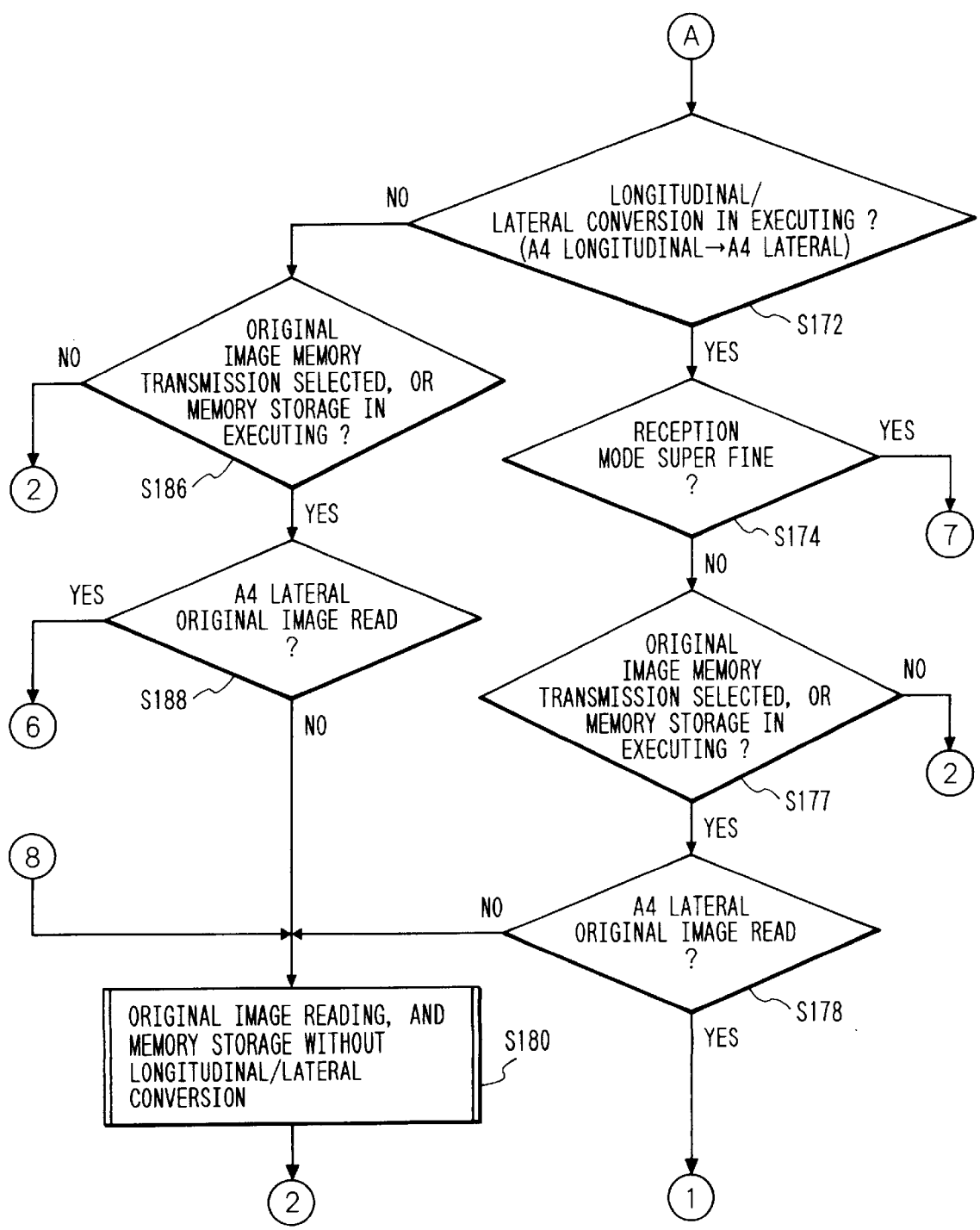
FIGS. 10, which is comprised of FIGS. 10A and 10B, to 13 are flowcharts showing a flow of processes according to the fifth embodiment.

In FIGS. 10A and 10B, in step S177, a check is made to see if the memory transmission of the original image has been selected or the storage into the memory circuit 18 is being executed or not. If YES, step S178 follows. If NO, step S168 follows.

In step S178, a check is made to see if the image of the original of A4 lateral which was set is read. When the original of A4 lateral is read, since the longitudinal/lateral conversion is necessary, step S182 follows. When an original other than the original of A4 lateral is read, since the longitudinal/lateral conversion is unnecessary, step S180 follows. The operations such that the image of the original which was set is read by the read circuit 10, is encoded by the encode circuit 16 without performing the longitudinal/lateral conversion, and is stored into the memory circuit 18 are executed for a predetermined time (for example, 500 μsec).

Figure 11:
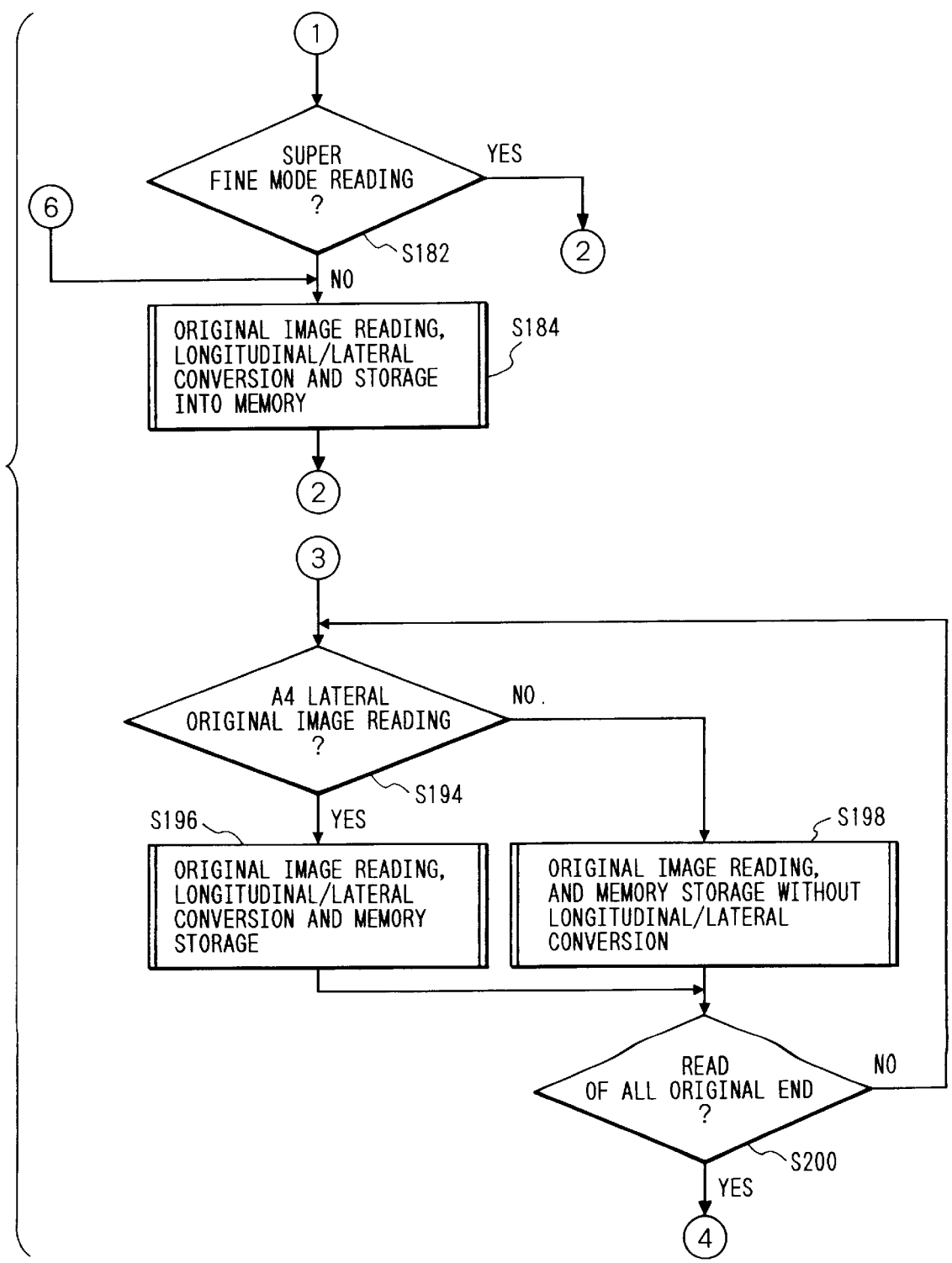

In FIG. 11, in step S182, a check is made to see if the reading resolution selected by the resolution selection circuit 46 is the super fine mode. When it is the super fine mode, since the longitudinal/lateral conversion of the dual operation is impossible, step S168 follows. If NO, since the longitudinal/lateral conversion of the dual operation can be performed, step S184 follows. The operations such that the image of the original which was set is read by the read circuit 10, is longitudinal/lateral converted by using the longitudinal/lateral conversion circuit 12, is encoded by the encode circuit 16, and is stored into the memory circuit 18 are executed for a predetermined time (for example, 500 μsec).

In FIGS. 10A and 10B, in step S186, a check is made to see if the memory transmission of the original image has been selected or the storage into the memory circuit 18 is being executed or not. If YES, step S188 follows. If NO, step S168 follows.

In step S188, a check is made to see if the image of the original of A4 lateral which was set is read. When an original other than the original of A4 lateral is read, since the longitudinal/lateral conversion is unnecessary, step S180 follows. When the original of A4 lateral is read, since the longitudinal/lateral conversion is needed, step S184 follows.

In step S190, a check is made to see if the storage of the original image into the memory circuit 18 has been selected or the storage into the memory circuit 18 is being executed or not. If YES, step S194 follows. If NO, step S192 follows.

In step S192, a check is made to see if there is any other original image which is not transmitted although the storage of the original image into the memory circuit 18 was finished. If YES, step S202 follows. If NO, step S162 follows.

In FIG. 11, in step S194, a check is made to see if the image of the original of A4 lateral which was set is read. When the original of A4 lateral is read, since the longitudinal/lateral conversion is needed, step S196 follows. The image of the original is read by the read circuit 10, is longitudinal/lateral converted by using the longitudinal/lateral conversion circuit 12, is encoded by the encode circuit 16, and is stored into the memory circuit 18. When an original other than the original of A4 lateral is read, since the longitudinal/lateral conversion is unnecessary, step S198 follows. The original image is read by the read circuit 10, is encoded by the encode circuit 16 without performing the longitudinal/lateral conversion, and is stored into the memory circuit 18.

In step S200, a check is made to see if the reading of the images of all of the originals has been finished. When the reading of the images of all of the originals is not finished yet, step S194 follows. If YES, step S202 follows.

In FIG. 12, in step S202, a signal at the signal level "1" is outputted from the signal line 54*a* and the CML is turned on. In step S204, a call is generated to the designated partner side through the telephone line 2*a*. In step S206, the image data stored in the memory circuit 18 is transmitted. After that, the processing routine is returned to step S162.

The process in step S168 mentioned above will now be described in steps S212 to S222.

First in step S212, a signal at the signal level "1" is outputted from the signal line 54*a* and the CML is turned on. In step S214, a pre-procedure is executed. In step S216, the reception of the image data through the telephone line 2*a* and the recording by the record circuit 36 are executed. When the image data of the original of A4 longitudinal is received and the recording paper of A4 lateral is set, the longitudinal/lateral conversion is executed.

After that, a post-procedure is executed in step S218. In step S220, a signal at the signal level "0" is outputted from the signal line 54*a* and the CML is turned off. In step S222, the processing routine is finished.

[Sixth Embodiment]

The sixth embodiment will now be described.

In the above fifth embodiment, when the memory storage which needs the longitudinal/lateral conversion is selected while the receiving and recording operations which need the longitudinal/lateral conversion are executed, in the case where the dual operation is impossible due to the lack of memory capacity of the memory circuit 14 and the resolution, the memory storage is executed after completion of the receiving and recording operations. In the sixth embodiment, however, in the receiving and recording operations and the reading operation, the longitudinal/lateral conversion is alternately executed every page.

Figure 14:
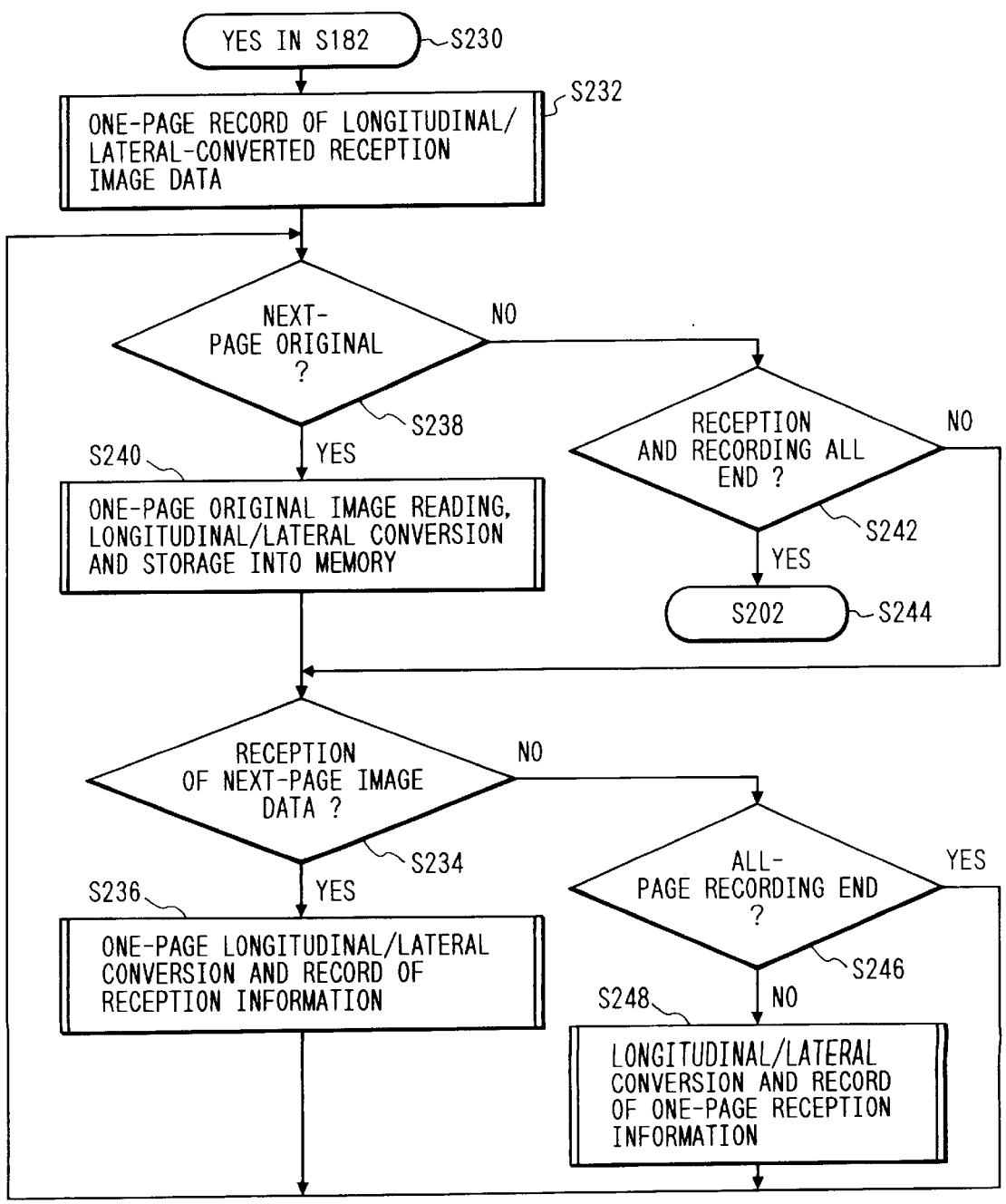
FIG. 14 is a flowchart showing a flow of processes according to the sixth embodiment.

FIG. 14 is a flowchart showing portions different from the fifth embodiment in the operation of the sixth embodiment.

In FIG. 14, step S230 corresponds to the discrimination result "YES" in step S182 in FIG. 11. In step S231, the received image data is longitudinal/lateral converted and the converted data as much as one page is recorded by the record circuit 36. The processing routine advances to step S238.

In step S234, a check is made to see if the image data of the next page has been received. When the image data of the next page is received, step S236 follows. If NO, step S244 follows.

In step S236, the received image data is stored into the memory circuit 32, the image data as much as one page is longitudinal/lateral converted by the longitudinal/lateral conversion circuit 12, and the converted data is recorded by the record circuit 36. In step S238, a check is made to see if the original of the next page has been set. If YES, step S240 follows. The image of the original as much as one page is read by the read circuit 10, is longitudinal/lateral converted by the longitudinal/lateral conversion circuit 12, is encoded by the encode circuit 16, and is stored into the memory circuit 18.

In step S238, when there is not an original of the next page, step S242 follows and a check is made to see if the reception and the recording of the received image data have been fully finished or not. When they are finished, step S244 (S202 in FIG. 12) follows. If NO, step S234 follows.

In step S246, a check is made to see if the recording of all of the pages has been finished. If YES, step S238 follows. If NO, step S248 follows and the received image data of one page is longitudinal/lateral converted by the longitudinal/lateral conversion circuit 12 and is recorded by the record circuit 36.

[Seventh Embodiment]

The seventh embodiment will now be described.

In the case where the memory storage accompanied with the longitudinal/lateral conversion is selected during the recording operation accompanied with the longitudinal/lateral conversion of the received image data, when the dual operation is impossible due to the lack of memory capacity of the memory circuit 14 and the resolution of the image data in the above fifth and sixth embodiments, according to the seventh embodiment, after completion of the receiving and recording operations, whether the image data is stored into the memory circuit 18 or the receiving and recording operations and the reading operation are alternately executed every page is selected by the selection circuit 45 and the process by either one of the above two methods is executed.

Figure 15:
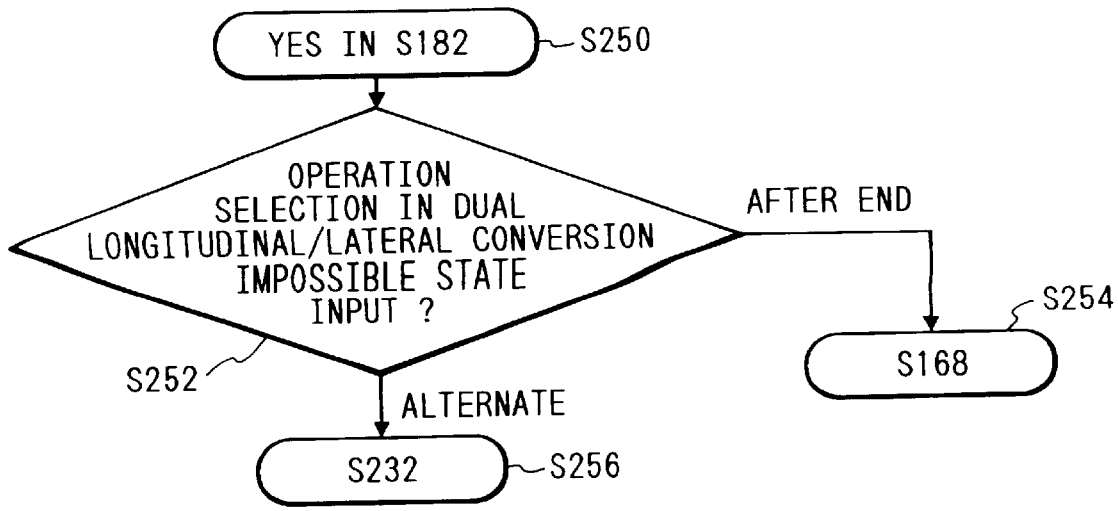
FIG. 15 is a flowchart showing a flow of processes according to the seventh embodiment.

FIG. 15 is a flowchart showing portions different from those in the fifth and sixth embodiments in the operation of the seventh embodiment.

In FIG. 15, step S250 corresponds to the discrimination result "YES" in step S182 in FIG. 11. In step S252, the information is inputted from the signal line 45a and which operation is selected as an operation in the case where the longitudinal/lateral conversion in the dual operation is impossible is discriminated. When the mode to store into the memory circuit 18 after completion of the receiving and recording operation is selected, step S254 (S168 in FIG. 11) follows. When the mode to alternately execute the receiving and recording operations and the reading operation every page is selected, step S256 (S232 in FIG. 14) follows.

[Eighth Embodiment]

The eighth embodiment will now be described.

According to the eighth embodiment, in the above fifth embodiment, when the image data read by the read circuit 10 at a resolution of the fine mode or less from the original of the A4 size is longitudinal/lateral converted by the longitudinal/lateral conversion circuit 12 and is stored into the memory circuit 18 for the purpose of the memory transmission, in the case where the image data is the data of the original of the A4 size and of a resolution less than the fine mode and the mode of the receiving and recording operation accompanied with the longitudinal/lateral conversion is selected, the longitudinal/lateral conversion is executed in the dual operation.

In case of the super fine mode, the longitudinal/lateral conversion is executed in either one of the reading and recording operations.

That is, in the embodiment, when the resolution of the image data which is stored into the memory circuit 18 for the memory transmission is equal to the standard mode or fine mode and when the longitudinal/lateral conversion is being executed, if the reception and recording accompanied with the longitudinal/lateral conversion are selected, the longitudinal/lateral conversion is executed in the dual operation so long as the resolution of the received image data is equal to the standard mode or fine mode. When it is the super fine mode, only the memory reception is simultaneously performed and, after completion of the storage of the image data into the memory for the purpose of the memory transmission, the image data which was memory received is longitudinal/lateral converted and recorded.

If the reception and recording accompanied with the longitudinal/lateral conversion are selected when the resolution of the image data which is stored into the memory circuit 18 is equal to the super fine mode and the longitudinal/lateral conversion is being executed for the purpose of the memory transmission, only the memory reception to the memory circuit 32 is executed simultaneously with the storage into the memory circuit 18 irrespective of the mode (resolution) of the received image data. After completion of the storage into the memory circuit 18, the information which was memory received by the memory circuit 32 is recorded.

Figure 16:
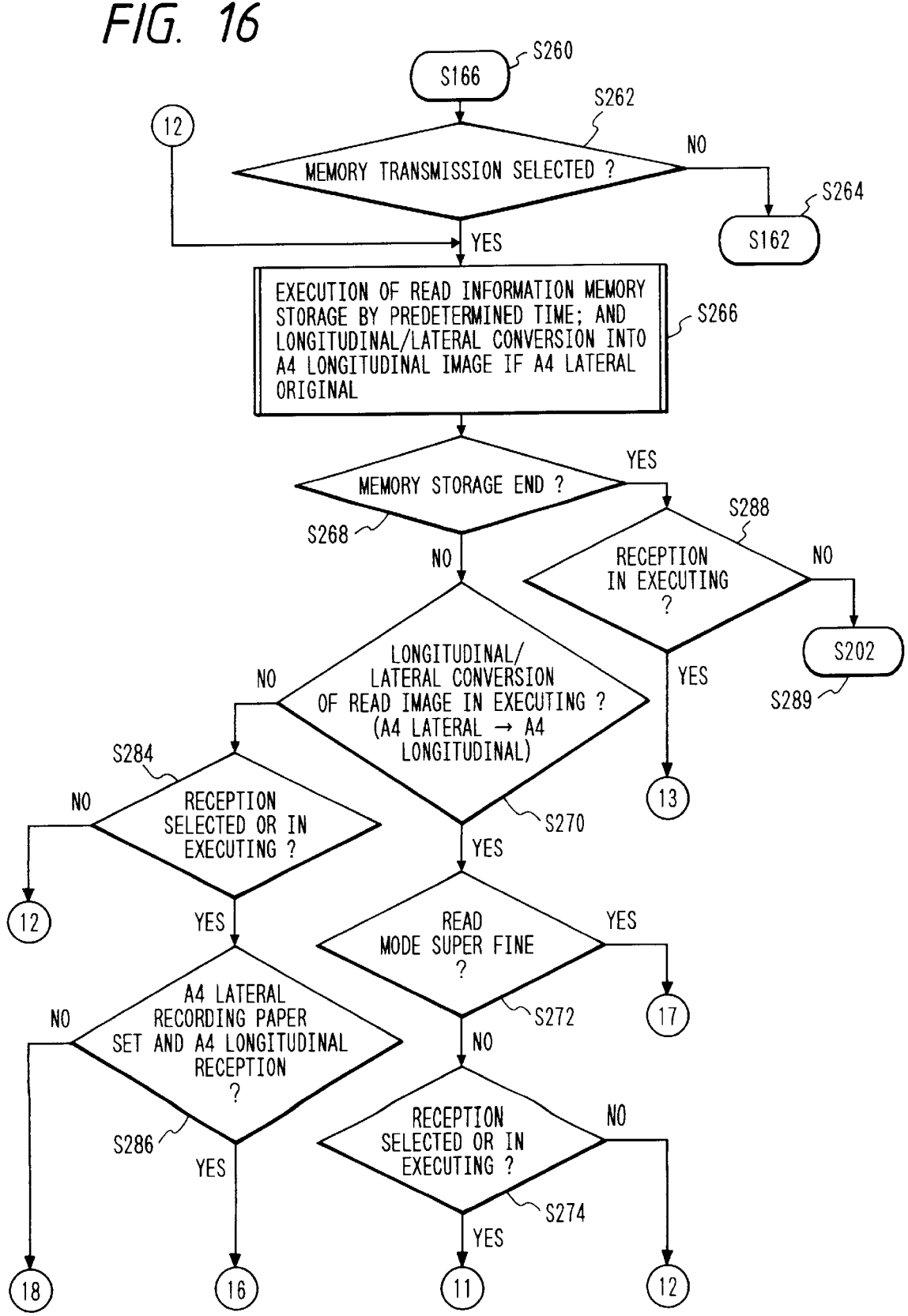
FIGS. 16 to 18 are flowcharts showing a flow of processes according to the eighth embodiment.
Figure 17:
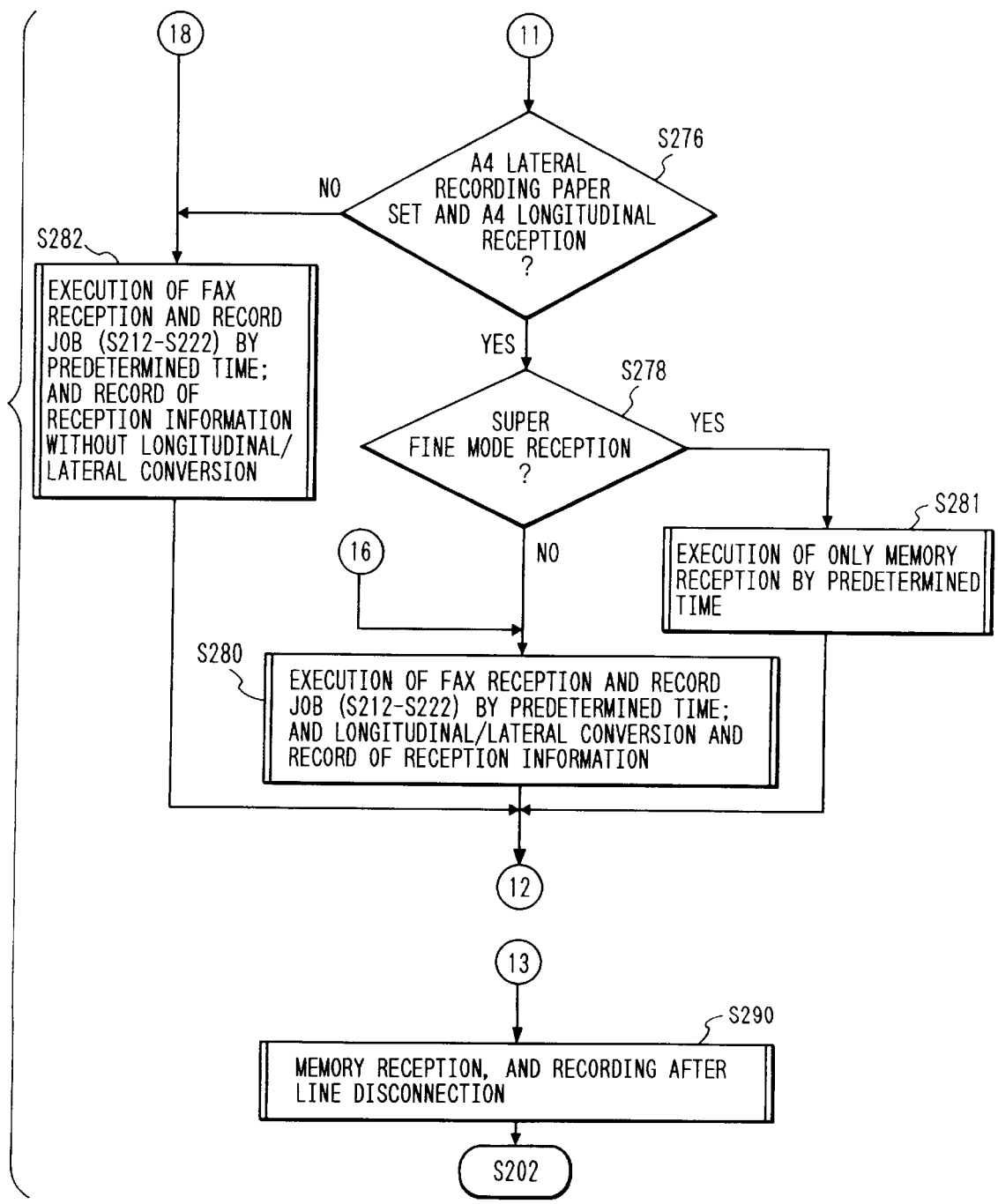
Figure 18:
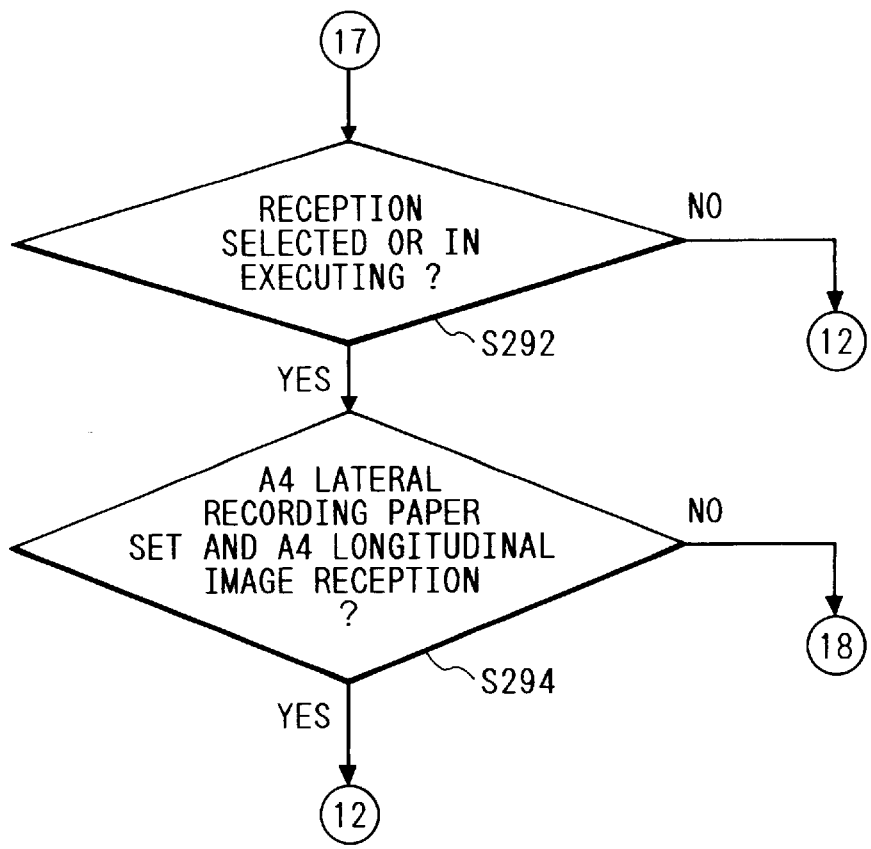

FIGS. 16 to 18 are flowcharts showing portions different from those in the above fifth embodiment in the operation of the eighth embodiment.

In FIG. 16, step S260 corresponds to step S166 in FIG. 10A. In step S262, a check is made to see if the memory transmission has been selected. When the memory transmission is selected, step S266 follows. If NO, step S264 (S162 in FIG. 10A) follows.

In step S266, the storage of the image read by the read circuit 10 into the memory circuit 18 is executed. When the original of A4 lateral is set, the image is longitudinal/lateral converted into the A4 longitudinal image by the longitudinal/lateral conversion circuit 12 and is encoded by the encode circuit 16 and is stored into the memory circuit 18. This process is executed for a predetermined time (for example, 500 $\mu$sec).

In step S268, a check is made to see if the storage of the image read by the read circuit 10 into the memory circuit 18 has been finished. When it is finished, step S288 follows. If NO, step S270 follows.

In step S270, the image of the original of A4 lateral which was set is read by the read circuit 10 and a check is made to see if the image has been converted into the image of A4 longitudinal by the longitudinal/lateral conversion circuit 12 or not. When the longitudinal/lateral conversion has been executed, step S272 follows. If NO, step S284 follows.

In step S272, the information is inputted from the signal line 46a and a check is made to see if the reading mode (resolution when the original image is read by the read circuit 10) is set to the super fine mode. When it is the super fine mode, step S292 follows. If NO, step S274 follows.

In step S274, a check is made to see if the reception of the image has been selected or is being executed or not. If YES, step S276 follows. If NO, step S266 follows.

In step S276, a check is made to see if the recording paper of A4 lateral has been set and the image of the original of A4 longitudinal is received or not. If YES, step S278 follows. If NO, step S282 follows.

In step S278, a check is made to see if the resolution of the received image is set to the super fine mode. When it is the super fine mode, since the longitudinal/lateral conversion cannot be executed in the dual operation, step S281 follows. Only the memory reception into the memory circuit 32 is executed for a predetermined time (for example, 500 $\mu$sec). If NO, step S280 follows and the JOB (steps S212 to S222) of the facsimile reception and recording is executed for a predetermined time (for example, about 500 $\mu$sec). The image received in the memory circuit 32 is longitudinal/lateral converted by the longitudinal/lateral conversion circuit 12 and is recorded by the record circuit 36.

In step S282, the JOB (steps S212 to S222) of the facsimile reception and recording is executed for a predetermined time (for example, 500 $\mu$sec). The image received in the memory circuit 32 is recorded by the record circuit 36 without performing the longitudinal/lateral conversion.

In step S284, a check is made to see if the reception of the image has been selected or is being executed. When the reception is selected or is being executed, step S286 follows. When the reception is not selected or is not being executed, step S266 follows.

In step S286, a check is made to see if the recording paper of A4 lateral has been set and the reception of the image of the original of A4 longitudinal is received or not. If YES, step S280 follows. If NO, step S282 follows.

In step S288, a check is made to see if the reception of the image is being executed. If YES, step S290 follows. If NO, step S289 (S202 in FIG. 12) follows.

In step S290, the received image data is stored into the memory circuit 32 (memory reception) and after the communication was finished and the line was disconnected, the image data stored in the memory circuit 32 is recorded by the record circuit 36. When the longitudinal/lateral conversion is necessary, the image data is longitudinal/lateral converted by the longitudinal/lateral conversion circuit 12 and is recorded.

In step S292, a check is made to see if the reception has been selected or is being executed or not. If YES, step S294 follows. If NO, step S266 follows.

In step S294, a check is made to see if the recording paper of A4 lateral has been set and the reception of the image of the original of A4 longitudinal has been selected or not. If YES, step S266 follows. If NO, step S282 follows.

[Ninth Embodiment]

The ninth embodiment will now be described.

In the eighth embodiment, in the case where the image read by the read circuit 10 has been stored into the memory circuit 18 for the purpose of the memory transmission accompanied with the longitudinal/lateral conversion and, when the reception of the image accompanied with the longitudinal/lateral conversion is selected, the dual operation is impossible due to the lack of memory capacity of the memory circuit 14 and the resolution of the image, the storage of the read image into the memory circuit 18 and the memory reception of the received image into the memory circuit 32 are simultaneously executed. After completion of the storage into the memory circuit 18, the memory reception is continued and the image which was memory received is read out from the memory circuit 32 and is recorded by the record circuit 36. In the ninth embodiment, however, when the recording operation and the reading operation are executed, the longitudinal/lateral conversion is alternately executed every page.

Figure 19:
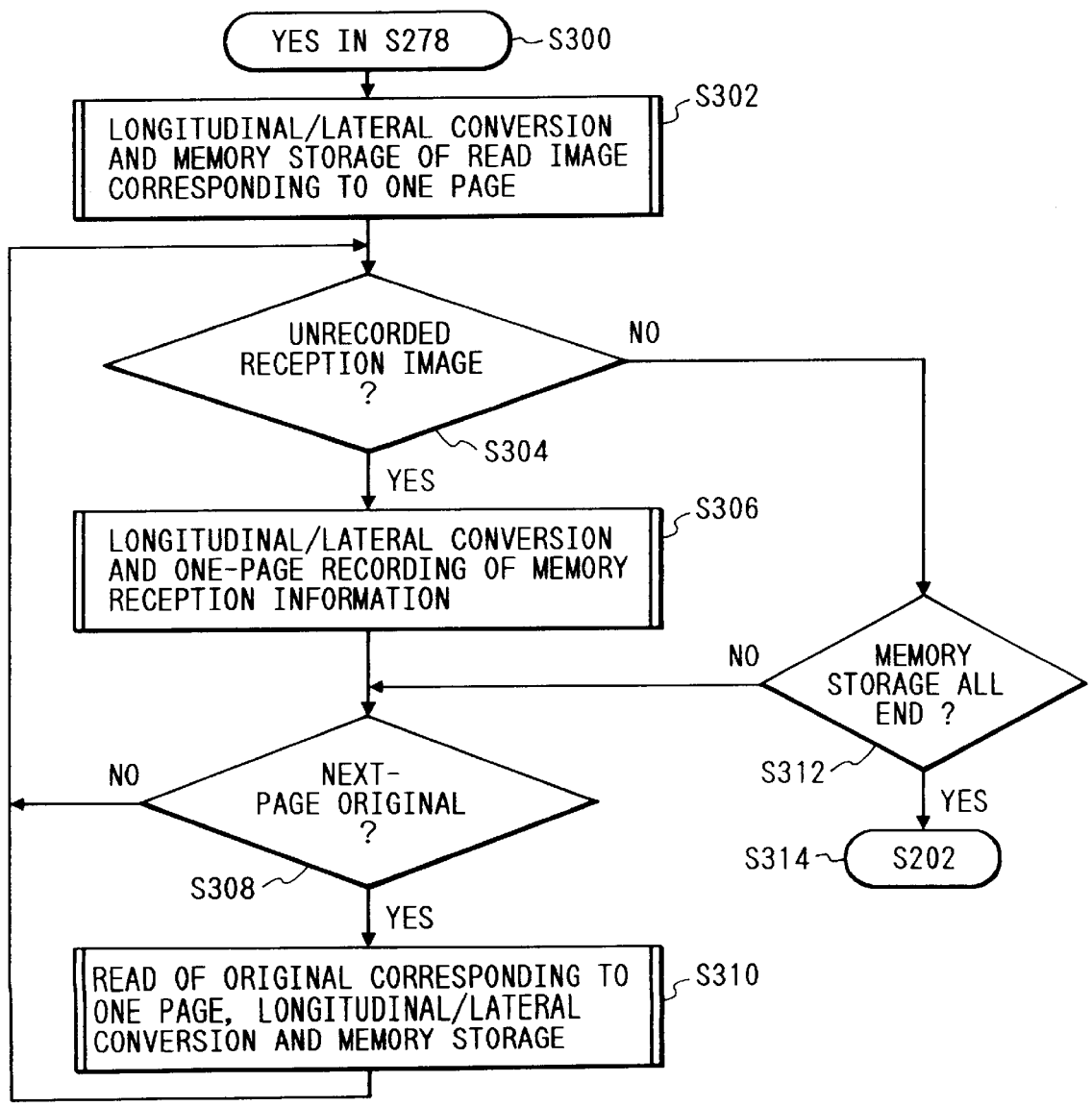
FIG. 19 is a flowchart showing a flow of processes according to the ninth embodiment.

FIG. 19 is a flowchart showing portions different from those in the above eighth embodiment in the operation of the ninth embodiment.

In FIG. 19, step S300 corresponds to the discrimination result "YES" in step S278 in FIG. 17. In step S302, the image of one page which was read by the read circuit 10 is longitudinal/lateral converted by the longitudinal/lateral conversion circuit 12 and stored into the memory circuit 18. The memory reception of the received image by the memory circuit 32 is continued. In step S304, a check is made to see if any other reception image which is not recorded by the record circuit 36 remains in the memory circuit 32. If YES, step S306 follows. If NO, step S312 follows.

In step S306, the image which was memory received by the memory circuit 32 is read out and is longitudinal/lateral converted by the longitudinal/lateral conversion circuit 12 and the converted image as much as one page is recorded by the record circuit 36. The memory reception is continued here. In step S308, a check is made to see if there is an original of the next page. If YES, step S310 follows. If NO, step S304 follows.

In step S310, the image of the original as much as one page is read by the read circuit 10, is longitudinal/lateral converted by the longitudinal/lateral conversion circuit 12, and is stored into the memory circuit 18. When there is a reception, the memory reception is performed. After that, the processing routine advances to step S304.

In step S312, a check is made to see if the storage of the read image into the memory circuit 18 has been fully finished or not. If YES, step S314 (S202 in FIG. 12) follows. If NO, step S308 follows.

[Tenth Embodiment]

The tenth embodiment will now be described.

According to the tenth embodiment, in the above eighth and ninth embodiments, when the read image is being stored into the memory circuit 18 for the purpose of the memory transmission accompanied with the longitudinal/lateral conversion, in the case where the memory reception and recording accompanied with the longitudinal/lateral conversion are selected, if the dual operation is impossible due to the lack of memory capacity of the memory circuit 14 and the resolution of the image, the memory reception is executed by the memory circuit 32 simultaneously with the storage of the read image into the memory circuit 18. After completion of the storage into the memory circuit 18, whether the image which was memory received is recorded or when the recording and reading operations of the image which was memory received are executed, the longitudinal/lateral conversion is executed every page is selected by the setting of the selection circuit 45, thereby executing the control.

Figure 20:
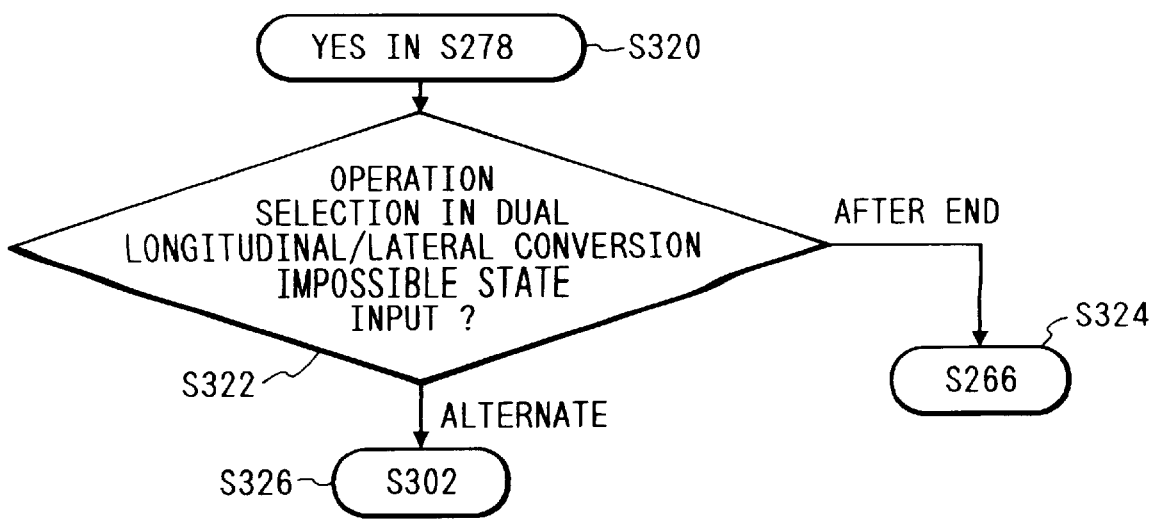
FIG. 20 is a flowchart showing a flow of processes according to the tenth embodiment.

FIG. 20 is a flowchart showing portions different from those in the above eighth and ninth embodiments in the operation of the tenth embodiment.

In FIG. 20, step S320 corresponds to the discrimination result "YES" in step S278 in FIG. 17. In step S322, the information is inputted from the signal line 45a and the operation selection when the longitudinal/lateral conversion in the dual operation is impossible is discriminated. After completion of the storage of the read image into the memory circuit 18 for the purpose of the memory transmission, if the mode in which the image that was memory received by the memory circuit 32 is recorded by the record circuit 36 is selected, step S324 (S266 in FIG. 16) follows. When the mode such that in case of performing the recording of the memory received image by the record circuit 36 and the reading operation by the read circuit 10, the longitudinal/lateral conversion is alternately executed every page is selected, step S326 (S302 in FIG. 19) follows.

In the above fifth to tenth embodiments, each of the individual specific operation example has been described. However, as a more general control, when the longitudinal/lateral conversion by the dual operation is selected, when the longitudinal/lateral conversion by the dual operation can be performed due to the sizes and resolutions of the original image and received image, the conversion is executed. When the longitudinal/lateral conversion is impossible, the longitudinal/lateral conversion during the execution is executed and, after that, the operation necessary for the next longitudinal/lateral conversion can be executed or the longitudinal/lateral conversion by the dual operation can be alternately executed every page.

The above fifth to seventh embodiments have been described with respect to the case where at the time of the receiving and recording operations, the memory storage is further selected. The eighth to tenth embodiments have been described with respect to the case where the memory reception and recording is selected during the memory storage for the memory transmission. However, even in the case where the operation of the memory transmission or the operations of the memory reception and recording are multiplexingly executed as well, the invention can be also applied.

Further, in the case where a resolution of the image is equal to or less than the fine mode and only one of the transmitting and receiving operations is selected, the data which was longitudinal/lateral converted by an amount of one page is stored into the memory. After that, when the data is being processed, the longitudinal/lateral conversion of the image of the next page is simultaneously executed. When the operation by the image of a resolution of the fine mode or less is selected, the longitudinal/lateral conversion of the image of one page is executed. After that, the converted data is stored into the memory and is processed. After completion of the process, the longitudinal/lateral conversion of the image of the next page can be also executed.

According to the invention as described above, the memory area which is shared in the longitudinal/lateral conversion for reading and the longitudinal/lateral conversion for recording can be effectively used. The smooth dual operation can be performed by a small memory capacity. When the dual operation is impossible, it is possible to properly cope with such a case and the smooth process can be assured.

In case of the super fine mode (8 pel/mm in the main scanning direction; 15.4 lines/mm in the sub-scanning direction), the longitudinal/lateral conversion can be performed for either one of the reading and recording operations. When the reading and recording operations are performed in the fine mode (8 pel/mm in the main scanning direction; 7.7 lines/mm in the sub-scanning direction), the longitudinal/lateral conversion by the dual operation upon reading and recording can be performed. In many communications, since resolutions of images are equal to or less than the fine mode, the longitudinal/lateral conversion by the dual operation in the reading and recording operations can be performed in many cases. The memory which is used for the longitudinal/lateral conversion can be effectively used.

When one operation (for example, reception and recording) is set to the fine mode, even if the other operation (for example, storage into the memory for the purpose of the memory transmission) is set to the fine mode (8 pel/mm in the main scanning direction; 7.7 lines/mm in the sub-scanning direction) or the standard mode (8 pel/mm in the main scanning direction; 3.85 lines/mm in the sub-scanning direction), the longitudinal/lateral conversion by the dual operation can be performed.

Even in the case where the longitudinal/lateral conversion by the dual operation is selected together with the reading and recording operations and the resolution of the image for the reception and recording which are being executed is high and the longitudinal/lateral conversion of the read image cannot be simultaneously executed, the operation can be properly executed. Those operations can be also selected by the user. The use efficiency can be improved.

When one operation (for example, storage into the memory for the purpose of the memory transmission) is set to the fine mode, even if another operation (reception and recording) is set to the fine mode or standard mode, the longitudinal/lateral conversion due to the dual operation can be performed.

The operation in the case where the longitudinal/lateral operation by the dual operation is selected together with the reading and recording and the resolution of the image to be stored into the memory for the purpose of the memory transmission during the execution is high and the longitudinal/lateral conversion of the image to be recorded cannot be simultaneously executed becomes clear. The operation can be selected by the user. The use efficiency can be improved.

Although the preferred embodiments of the invention have been described above, the invention is not limited to the foregoing embodiments but many modifications and variations are possible within the spirit and scope of the appended claims of the invention.

What is claimed is:

1. An image communicating apparatus comprising:
   receiving means for receiving image data from a transmission side;
   recording means for recording the image data received by said receiving means onto a recording sheet;
   detecting means for detecting a size and a direction of the recording sheet;
   notifying means for notifying a resolution of the image data which can be received to the transmission side; and
   control means for controlling so that a resolution which is notified by said notifying means is made different in accordance with a detection result by said detecting means.

2. An apparatus according to claim 1, further having judging means for judging whether the image data which is received by said receiving means is rotated or not on the basis of the detection result by said detecting means, and
   wherein said control means controls so as to allow said notifying means to notify a coarse resolution when it is judged by said judging means that the image data is rotated.

3. An apparatus according to claim 1, further having discriminating means for discriminating a vacant capacity in a memory which is used to rotate the image data which is received by said receiving means,
   and wherein said control means controls so as to make the resolution which is notified by said notifying means different in accordance with a discrimination result by said discriminating means and the detection result by said detecting means.

4. An image communicating apparatus comprising:
   reading means for reading an image of an original which was set;
   transmitting means for transmitting the image read by said reading means;
   detecting means for detecting a size and a direction of the original; and
   control means for controlling so as to make a resolution of the image which is read by said reading means different in accordance with a detection result by said detecting means.

5. An apparatus according to claim 4, further having judging means for judging whether the image which is read by said reading means is rotated or not in accordance with the detection result by said detecting means, and
   wherein said control means controls so as to allow said reading means to read the image of the original at a coarse resolution in the case where it is judged by said judging means that the image is rotated.

6. An apparatus according to claim 4, further having discriminating means for discriminating a vacant capacity of a memory which is used to rotate the image which is read by said reading means, and
   wherein said control means controls so as to make the resolution of the image which is read by said reading means different in accordance with a discrimination result by said discriminating means and the detection result by said detecting means.

7. An image processing method comprising:
   a receiving step of receiving image data from a transmission side;
   an outputting step of outputting the image data received in said receiving step onto a recording sheet;
   a determining step of determining size and direction of the recording sheet;
   a notifying step of notifying the transmission side of a resolution of the image data which can be received; and
   a controlling step of controlling such that the resolution of which the transmission side is notified in said notifying step is made different in accordance with the determination in said determining step.

8. An image processing method comprising:
   an inputting step of inputting image data of an image of an original which was set;

a transmitting step of transmitting the image data inputted in said inputting step;

a determining step of determining a size and a direction of the original; and a controlling step of controlling so as to make a resolution of the image data which is inputted in said inputting step different in accordance with a determination made in said determining step.

9. An image processing apparatus comprising:

first input means for inputting image data;

second input means for inputting image data;

storing means for concurrently storing the image data input by said first and second input means;

determining means for determining remaining capacity of said storing means which stores the image data;

rotating means for rotating the image data input by said first input means and the image data input by said second input means using said storing means; and control means for controlling the rotation by said rotating means of the image data input by said first input means and the image data input by said second input means in accordance with a determination result by said determining means.

10. An apparatus according to claim 9, wherein said first input means inputs the image data obtained by reading an image on a document.

11. An apparatus according to claim 9, wherein said second input means inputs the image data received via a line.

12. An apparatus according to claim 9, wherein said control means controls said rotating means such that the rotation of the image data inputted by said first input means and the rotation of the image data inputted by said second input means are alternately executed by a predetermined amount.

13. An apparatus according to claim 9, wherein said control means controls said rotating means such that the rotation of the image data inputted by said first input means and the rotation of the image data inputted by said second input means are alternately executed for each page.

14. An image processing apparatus comprising:

first input means for inputting image data;

second input means for inputting image data;

rotating means for rotating the image data input by said first input means and the image data input by said second input means; and control means for controlling said rotating means such that the rotation of the image data input by said first input means and the rotation of the image data input by said second input means are executed, wherein said control means controls the execution of the image data rotation by said rotating means in accordance with characteristics of the image data input by said first input means and/or said second input means.

15. An apparatus according to claim 14, wherein the characteristics include a size of the image data.

16. An apparatus according to claim 14, wherein the characteristics include a resolution of the image data.

17. An image processing method comprising:

a first input step of inputting image data;

a second input step of inputting image data;

a storing step of concurrently storing in a storing means the image data input by said first and second input steps;

a determining step of determining remaining capacity of said storing means which stores the image data;

a rotating step of rotating the image data input in said first input step and the image data input in said second input step using said storing means; and a control step of controlling the rotation in said rotating means of the image data input in said first input step and the image data input in said second input step in accordance with a determination result by said determining step.

18. An image processing method comprising:

a first input step of inputting image data;

a second input step of inputting image data;

a rotating step of rotating the image data input in said first input step and the image data input in said second input step; and a control step of controlling said rotating step such that the rotation of the image data input in said first input step and the rotation of the image data input in said second input step are executed, wherein said control step controls the execution of the image data rotation in said rotating step in accordance with characteristics of the image data input in said first input step and/or said second input step.

* * * * *

UNITED STATES PATENT AND TRADEMARK OFFICE
CERTIFICATE OF CORRECTION

PATENT NO. : 5,943,449

DATED : August 24, 1999

INVENTOR(S) : TAKEHIRO YOSHIDA

It is certified that error appears in the above-identified patent and that said Letters Patent is hereby corrected as shown below:

COLUMN 5

Line 62, "FIG..3," should read --FIG.3,--.

COLUMN 6

Line 6, "have" should read --has--.

COLUMN 7

Line 10, "don't" (first occurrence) should be deleted.

COLUMN 8

Line 3, "read" should read --the read--.

Signed and Sealed this

Twelfth Day of December, 2000

Attest:

Q. TODD DICKINSON

*Attesting Officer*

*Director of Patents and Trademarks*